United States Patent [19]

Hamada et al.

[11] Patent Number: 5,691,975
[45] Date of Patent: *Nov. 25, 1997

[54] METHOD AND APPARATUS FOR CONTROL IN ATM

[75] Inventors: Takeo Hamada; Takafumi Chujo, both of Kawasaki, Japan

[73] Assignee: Fujitsu Limited, Kanagawa, Japan

[*] Notice: The term of this patent shall not extend beyond the expiration date of Pat. No. 5,581,544.

[21] Appl. No.: 290,728

[22] PCT Filed: Sep. 2, 1993

[86] PCT No.: PCT/JP93/01243

§ 371 Date: Jan. 6, 1995

§ 102(e) Date: Jan. 6, 1995

[87] PCT Pub. No.: WO94/21068

PCT Pub. Date: Sep. 15, 1994

[30] Foreign Application Priority Data

Mar. 12, 1993 [JP] Japan ................... 5-052415

[51] Int. Cl.⁶ ................ H04J 3/14; H04L 12/56
[52] U.S. Cl. ................ 370/232; 370/253; 370/463
[58] Field of Search .............. 370/17, 94.1, 94.2, 370/85.6, 84, 230, 232, 233, 234, 252, 253, 395

[56] References Cited

U.S. PATENT DOCUMENTS

| | | | |
|---|---|---|---|
| 5,224,091 | 6/1993 | Brandt | 370/85.6 |
| 5,231,633 | 7/1993 | Hluchyj et al. | 370/94.1 |
| 5,268,900 | 12/1993 | Hluchyj et al. | 370/94.1 |
| 5,313,579 | 5/1994 | Chao | 370/94.1 |
| 5,367,523 | 11/1994 | Chang et al. | 370/84 |
| 5,388,097 | 2/1995 | Baugher et al. | 370/85.6 |

FOREIGN PATENT DOCUMENTS

| | | |
|---|---|---|
| 3235550 | 10/1991 | Japan. |
| 4355535 | 12/1992 | Japan. |

OTHER PUBLICATIONS

Arai, Hideaki et al., An Analysis of Call Admission Control in the ATM Network, Theses by IECE, vol. J72-B+I, No. 11, Nov. 25, 1989, pp. 1000-1007.

*Primary Examiner*—Douglas W. Olms
*Assistant Examiner*—Min Jung
*Attorney, Agent, or Firm*—Helfgott & Karas, P.C.

[57] ABSTRACT

The upper and lower bounds of the probability distributions of the number of arrivals at given arrival rates and the upper and lower bounds of the distributions of the arrival rates of each call class are prestored in memory, and by referencing such prestored values, the distributions of the arrival rate and the number of arrivals are obtained (step 104), then, the upper and lower bounds of the resulting cell length distribution are calculated to obtain safe-side evaluation values of QOS parameters (step 106). Based on the obtained QOS parameters, admission or rejection of a call is determined (step 108). Using this method, a function defining the upper bound of the probability distribution of the cell flow rate at the outgoing line side can also be obtained, from which a threshold value is calculated, and abnormality in the cell flow rate is judged on the basis of the threshold value. Furthermore, using a similar method to the above one, it is possible to evaluate the cell length distribution when a UPC is provided on the outgoing line side, and from the result of the evaluation, an optimum declared value to the UPC can be obtained to set up an internetwork connection via the UPC.

37 Claims, 16 Drawing Sheets

Fig. 4

| CALL CLASS = 1 | | | | |
|---|---|---|---|---|
| MULTIPLEXED MEAN NUMBER | LOWER BOUND | | UPPER BOUND | |
| | MEAN | VARIANCE | MEAN | VARIANCE |
| 999 | 0.29879 | 0.00714314 | 0.299209 | 0.00717642 |
| 1000 | 0.299089 | 0.0071512 | 0.299509 | 0.00718143 |
| 1001 | 0.299381 | 0.00715876 | 0.299809 | 0.00718689 |
| 1002 | 0.299689 | 0.00716188 | 0.300109 | 0.0071894 |
| 1003 | 0.299992 | 0.00716551 | 0.300409 | 0.00719191 |

METHOD AND APPARATUS FOR CONTROL IN ATM

TECHNICAL FIELD

The present invention relates to a method and apparatus for control in an asynchronous transfer mode (ATM) network providing a variable-bit-rate (VBR) service, and more particularly to a method and apparatus for call admission control, cell flow rate monitoring, and internetwork connection in an ATM network providing a VBR service.

BACKGROUND ART

In an ATM multiplexing transmission apparatus, call admission control is performed to prevent degradation in the quality of service (QOS) due to cell losses caused by a buffer overflow, delays, etc., resulting from an increase in traffic. For this purpose, the variation of QOS caused by an increase in traffic after multiplexing is evaluated using UPC (utilization parameter control) parameters with the peak and average rates defined.

In Prior Art (1), according to Hatono, Kawakita, and Mizuno, "Hierarchic fluid approximation model for ATM traffic analysis," IEICE Technical Report SSE91-152, pp. 13–18, March 1992, bursty cell arrivals are approximated by a fluid, and using a stochastic differential equation expressing the variation of the cell length in a buffer, the distribution of the cell length is obtained, from which the cell loss rate is determined.

In Prior Art (2), according to Hirano and Watabe, "Evaluation of burst traffic multiplexing characteristics in ATM switching," Trans. IEICE (B-1), Vol. J72-B-I, No. 4, pp. 264–271, April 1989, and H. Heffes and D. Lucantoni, "A Markov modulated characterization of packetized voice and data traffic and related statistical multiplexer performance," IEEE Jour. SEl. Areas Commun. Vol. SAC-4, No. 6, pp. 833–846, 1986, a cell arrival process is considered using a Markov model, and from a state transition equation in state space expressing simultaneously the state of each call source and the cell length in a buffer, the cell length in a stationary state is obtained, from which the cell loss rate and time delay are calculated.

In Prior Art (3), according to Nakagawa, "Analysis of VBR pass/channel characteristics defined by deterministic parameters," IEICE Technical Report CAS91-150, pp. 1–6, March 1992, and Y. Miyao, "A Call Admission Control Scheme in ATM Networks," Proc. of ICC' 91, pp. 14.5.1–14.5.6, June 1991, the upper bound of the number of cell arrivals or the arrival rate is evaluated using the Chernoff upper bound, thereby obtaining the upper limit of the cell loss rate.

Each of the above prior art examples has a shortcoming of its own: with Prior Art (1), there is no guarantee that QOS will be evaluated on the safe side; with Prior Art (2), the amount of calculation involved is so large that it is difficult to obtain the result within a practical time; and with Prior Art (3), the upper limit to be evaluated is large, so that the gain after multiplexing becomes small. Furthermore, Prior Art (3) has the shortcomings that it is not possible to evaluate delays among QOS, and that when priorities are allocated among call classes, QOS evaluation on a priority class basis is not possible.

An ATM cell flow rate monitoring unit is a device used to measure the number of cells passing through a given point on a transmission path in a given time interval, detect transmission path breakage, failures of switching nodes such as exchanges, cross connects, multiplexers, etc., failures of a UPC monitoring unit, etc., and alert the network control unit to the occurrence of such failures.

In the prior art relating to such an apparatus, according to Chaki, Shinozaki, et al., "A proposal of ATM network resource management for high-speed data," IEICE Technical Report SSE91-150, pp. 1–6, March 1992, the number of arriving cells is continuously monitored in order to detect the occurrence of congestion along a transmission path and to perform necessary control, and when the measured cell discard rate has exceeded a predetermined value continuously for a predetermined length of time, then the path is judged as being congested, and the necessary control is performed.

According to Okatsu, Matsunaga, and Ueda, "A study on a cell flow rate monitoring method for ATM networks," 1992 Spring National Convention, B-727, the upper limit of the path utilization rate is set for each transmission path, and when this upper limit is exceeded continuously for a predetermined length of time, then the path is judged as being congested, and the necessary control is performed.

Thus, in the prior art, the monitoring parameters (monitoring time, upper limit of cell discard rate, etc.) relating an increase in the cell flow rate under observation to congestion are obtained experimentally, and no theoretical relationships with the parameters reported to the UPC are given; therefore, when applied to a variable-bit-rate (VBR) communication, the prior art method has had the difficulty in distinguishing the cause of cell flow rate increase between the following two:

(1) Abnormal congestion due to hardware failure such as failure of switching node, UPC monitoring unit, etc.

(2) Congestion that can occur even under normal conditions, due to a prolonged bursty traffic condition in variable-bit-rate communication.

The prior art has had the further shortcoming that since the congestion due to the cause (2) is affected by the call class of the admitted call, it is difficult to set such a monitoring parameter that can detect the cause (1) alone.

When connecting a LAN, based on Ethernet, for example, to an ATM public network via an internetwork interface unit, when connecting an ATMLAN to an ATM public network, or in general, when connecting two networks together, a user parameter control (UPC) unit or a traffic shaper needs to be provided at the junction between the networks. Based on the traffic parameter declared from the network at one side, the UPC unit either discards the cells exceeding the value of the parameter or disables the transmission of such cells to the network at the other side. The traffic shaper is used to control the intervals of cell transmission from the call source that is generating a large number of successive cells in a short period of time. This can be considered as the UPC which is provided with a buffer on the input side thereof.

In the above case, the values to be declared to the UPC unit or the traffic shaper need to be properly determined in order to ensure safe and economical transmission of large volumes of information between the networks. The UPC unit interposed between the networks influences the traffic in the input network. In determining proper values to be declared, this influence must be taken into account so that the QOS in the input network can be properly evaluated.

In relation to this, Nakagawa proposes in his "Analysis of VBR pass/channel characteristics defined by deterministic parameters," IEICE Technical Report CAS91-150, pp. 1–6, March 1992, that $(T_o, X_o, T, X)$ be used as the parameters to define the cell traffic. ($T_0$, $X_0$) respectively represent the specified time interval and the number of cells monitored in that interval for peak rate, while (T, X) respectively represent the specified time interval and the number of cells monitored in that interval for average rate. An application of this method to ATM call admission control is described in the above-mentioned document.

In Kato, Abe, and Munemiya, "A study on traffic shaping in ATM networks," IEICE Technical Report SSE91-13, pp. 43–47, May 1991, the concept of traffic shaping is explained, and a method of analysis under a certain assumption is shown.

In F. M. Brochin, "A Cell Admission Policy for LAN to LAN Interconnection," IEICE Technical Report IN92-27, pp. 17–22, July 1991, a traffic shaping method, called a cell spacer, is proposed, and a method of analysis for an MMPP model is shown.

In Iisaku and Ishikura, "A Proposal of LAN to ATM Interconnection Method," IEICE Technical Report IN89-66, pp.13–18, September 1989, an interconnection method is proposed for interconnecting a LAN, a private network, to an ATM.

As described, in the prior art, when the process on the output side of the internetwork interface unit or the multiplexing apparatus is controlled by UPC, since the relationship between the parameters defining the traffic on the input side and the cell length distribution in the buffer is not known, it is not possible to evaluate the QOS properly on the safe side, and therefore, the QOS cannot be assured.

DISCLOSURE OF THE INVENTION

Accordingly, it is a first object of the invention to provide a method and apparatus for ATM call admission control, which overcomes any of the above enumerated shortcomings associated with the prior art and which accomplishes safe-side evaluation within a practical time and yet realizes a high multiplexing gain.

It is a second object of the invention to provide a method and apparatus for cell flow rate monitoring, capable of properly detecting abnormal congestion occurring along a transmission path.

It is a third object of the invention to provide a method and apparatus for internetwork connection, capable of transmitting large volumes of information between networks economically and safely.

According to the invention, there is provided a call admission control method in an asynchronous transfer mode, comprising the steps of: storing first data which include information concerning upper bounds of probability distributions of the number of arrivals for a plurality of values of arrival rate; determining an upper bound of a probability distribution of an arrival rate in a call admitted state which is to be evaluated; determining, by using the first data, an upper bound of a probability distribution of a cell length which is given by upper bounds of probability distributions of the number of arrivals along the thus determined upper bound of the probability distribution of the arrival rate; and determining, by using the upper bound of the probability distribution of the cell length, upper limits of parameters representing the quality of service in the call admitted state.

According to the invention, there is also provided a call admission control apparatus in an asynchronous transfer mode, comprising: first storage means for storing first data which include information concerning upper bounds of probability distributions of the number of arrivals for a plurality of values of arrival rate; arrival rate determining means for determining an upper bound of a probability distribution of an arrival rate in a call admitted state which is to be evaluated; cell length determining means for determining, by using the first data, an upper bound of a probability distribution of a cell length which is given by upper bounds of probability distributions of the number of arrivals along the thus determined upper bound of the probability distribution of the arrival rate; and parameter determining means for determining, by using the upper bound of the probability distribution of the cell length, upper limits of parameters representing quality of service in the call admitted state.

According to the invention, there is also provided a cell flow rate monitoring method in an asynchronous transfer mode, comprising the steps of: storing first data which include information concerning upper bounds of the probability distributions of the number of arrivals for a plurality of values of arrival rate; determining an upper bound of a probability distribution of an arrival rate; determining, by using the first data, an upper bound of a probability distribution of a cell length which is given by upper bounds of probability distributions of the number of arrivals along the thus determined upper bound of the probability distribution of the arrival rate; determining a threshold value for the cell flow rate at an outgoing line side by using the upper bounds of the probability distributions of the number of arrivals, the upper bound of the probability distribution of the cell length, and the upper bound of the probability distribution of the arrival rate; and judging abnormality in the cell flow rate at the outgoing line side on the basis of the threshold value.

According to the invention, there is also provided a cell flow rate monitoring apparatus in an asynchronous transfer mode, comprising: first storage means for storing first data which include information concerning upper bounds of probability distributions of the number of arrivals for a plurality of values of arrival rate; arrival rate determining means for determining an upper bound of a probability distribution of an arrival rate; cell length determining means for determining, by using the first data, an upper bound of a probability distribution of a cell length which is given by the upper bounds of the probability distributions of the number of arrivals along the thus determined upper bound of the probability distribution of the arrival rate; threshold value determining means for determining a threshold value for the cell flow rate at an outgoing line side by using the upper bounds of the probability distributions of the number of arrivals, the upper bound of the probability distribution of the cell length, and the upper bound of the probability distribution of the arrival rate; and abnormality judging means for judging abnormality in the cell flow rate at the outgoing line side on the basis of the threshold value.

According to the invention, there is also provided an internetwork connection method, in an asynchronous transfer mode, for connecting a first network to a second network via a user parameter control, comprising the steps of: storing first data for the first network, which data include information concerning upper bounds of probability distributions of the number of arrivals for a plurality of values of arrival rate; determining an upper bound of a probability distribution of an arrival rate in the first network; determining, by using the first data, an upper bound of a probability distribution of a cell length which is given by upper bounds of probability distributions of the number of arrivals along the thus determined upper bound of the probability distribution of the arrival rate by using a transition probability matrix containing the characteristics of the user parameter control; and determining, by using the upper bound of the probability distribution of the cell length, upper limits of parameters representing the quality of service when the first network is connected to the second network.

According to the invention, there is also provided an internetwork connection apparatus, in an asynchronous transfer mode, for connecting a first network to a second network via a user parameter control, comprising: first storage means for storing first data for the first network, which data include information concerning upper bounds of probability distributions of the number of arrivals for a plurality of values of arrival rate; arrival rate determining means for determining an upper bound of a probability distribution of an arrival rate in the first network; cell length determining means for determining, by using the first data, an upper bound of a probability distribution of a cell length which is given by the upper bounds of the probability distributions of the number of arrivals along the thus determined upper bound of the probability distribution of the arrival rate by using a transition probability matrix containing the characteristics of the user parameter control; and parameter determining means for determining, by using the upper bound of the probability distribution of the cell length, upper limits of parameters representing the quality of service when the first network is connected to the second network.

BRIEF DESCRIPTION OF THE DRAWINGS

FIG. 4 is a diagram showing an example of data on the distribution of arrival rate;

BEST MODE FOR CARRYING OUT THE INVENTION

1. Call admission control

Figure 1:
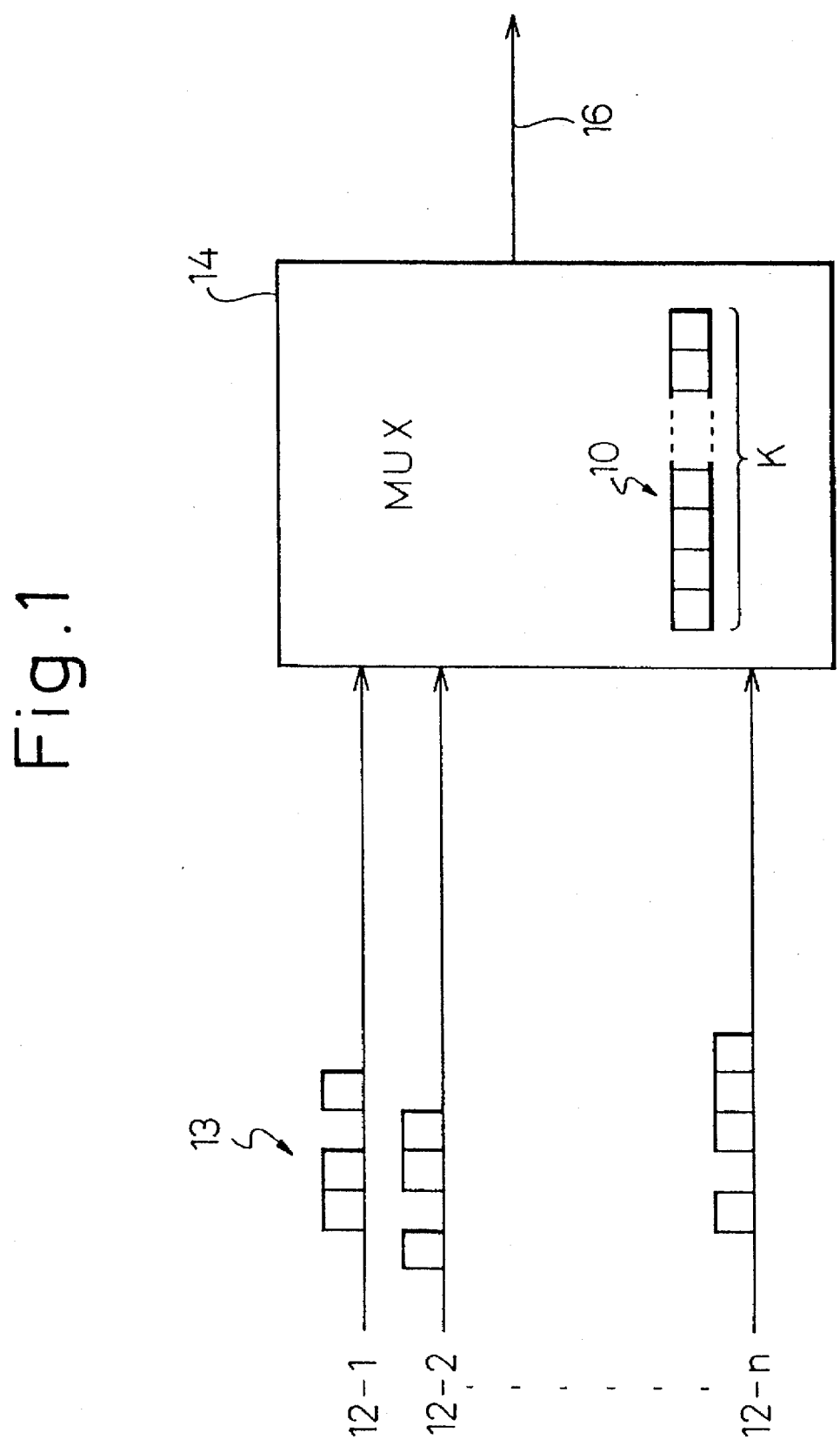
FIG. 1 is a diagram showing a model for an ATM multiplexing apparatus.

A multiplexing apparatus 14 as shown in FIG. 1 will be discussed below. The multiplexing apparatus 14 has a buffer 10 capable of holding up to K cells, and multiplexes cells 13 from a maximum of n call sources, 12-1 to 12-n.

Here, the reciprocal of the rate of an outgoing line 16, i.e., the time required for one cell to be deposited from the multiplexing apparatus 14 onto the outgoing line, is set as the unit time. When the number of cells remaining in the buffer at time t (hereinafter called the cell length) is denoted by $q_t$, and the number of cells arriving at the multiplexing apparatus 14 in the unit time from time t (hereinafter called the number of arrivals or the arrival count) is denoted by at, then the cell length $q_{t+1}$, when the unit time has elapsed from time t, is expressed as $$\begin{aligned} q_{t+1} &= 0 & (q_t + a_t - 1 < 0) \\ q_{t+1} &= q_t + a_t - 1 & (0 \leq q_t + a_t - 1 \leq K) \\ q_{t+1} &= K & (K < q_t + a_t - 1) \end{aligned} \quad (1)$$

The first equation in (1) represents the buffer 10 in an empty state, and the third equation represents the buffer 10 in an overflow state, causing cell discarding.

When the incoming line is asynchronous with respect the outgoing line, the number of arrivals, $a_t$, is a random variable, and therefore, $q_t$ is also a random variable. When the probability of the number of arrivals, $a_t$, being i (i=0, 1, ..., n) is represented by a probability distribution $a_t(i)$, and a (K+1)-dimensional random vector $q_t$ is constructed which has as its element the probability $q_t(i)$ of the cell length $q_t$ being i (i=0, 1, ..., K), then the cell length distribution $q_{t+1}$ at time t+1 can be expressed as $$Q_{t+1} = Mq_t \quad (2)$$

where M is a transition probability matrix containing K+1× K+1 elements. The matrix M is expressed by $$M = \begin{bmatrix} a_t(0)+a_t(1) & a_t(0) & 0 & \cdots & & & 0 \\ a_t(2) & a_t(1) & a_t(0) & & & & \cdot \\ \cdot & \cdot & \cdot & & & & \cdot \\ a_t(n) & \cdot & \cdot & & 0 & & \\ 0 & a_t(n) & \cdot & & 0 & & \\ \cdot & \cdot & \cdot & & a_t(0) & & \\ 0 & 0 & 0 & \cdots & a_t(1)+\ldots+a_t(n) & & \end{bmatrix} \quad \text{(for } n \leq K\text{)}$$

$$M = \begin{bmatrix} a_t(0)+a_t(1) & & a_t(0) & & 0 & 0 & \cdots & 0 \\ a_t(2) & & a_t(1) & & a_t(0) & 0 & \cdots & \cdot \\ \cdot & & \cdot & & & & & \cdot \\ \cdot & & \cdot & & & & & \cdot \\ \cdot & & \cdot & & & & & \cdot \\ a_t(K+1)+a_t(K+2)+\ldots+a_t(n) & & a_t(K)+a_t(K+1)+\ldots+a_t(n) & & \cdot & \cdot & & a_t(1)+\ldots+a_t(n) \end{bmatrix} \quad \text{(for } n > K\text{)}$$

In the case of a constant-bit-rate (CBR) service, since the rate at which cells arrive from each call source per unit time (hereinafter called the arrival rate) is constant, the arrival count distribution $a_t(i)$ is stationary along the time axis, in which case the cell length distribution q in a stationary state can be obtained by solving the linear equation $$Mq=q \quad (4)$$

Once the cell length distribution q is obtained, parameters of service quality (QOS), such as cell loss rate, delay time, etc., can be readily calculated. On the other hand, in the case of a variable-bit-rate (VBR) service, since the arrival rate from each call source varies, the overall arrival rate will vary in a complicated manner. As a result, the arrival count distribution $a_t(i)$ is no longer stationary, and the cell length distribution q cannot be determined directly by using the above method.

In the call admission control algorithm used in the present invention, the overall arrival rate $r_t$ is treated as a third random variable, and a three-dimensional probability distribution for random variables $a_t$, $r_t$, $q_t$ is considered, which is $$B(x, y, z)=P\{a_t \leq x \cap r_t \leq y \cap q_t \leq z\} \quad (5)$$

Then, the cell length distributions that provide its upper and lower bounds (to be defined later) are determined, from which the upper and lower limits of each QOS parameter are calculated. The VBR characteristic of each call source is modelled using an intermittent Poisson process (IPP).

To give the definitions of upper bound and lower bound, the partial order (order relation) $\prec$ between probability distributions F and G is defined as follows.

$$F \prec G \Leftrightarrow \int_{-\infty}^{x} dF \leq \int_{-\infty}^{x} dG \, \forall x \quad (6)$$

Here $$\int_{-\infty}^{\infty} dF = 1, \int_{-\infty}^{\infty} dG = 1$$

Hence $$F \prec G \Leftrightarrow \int_{-\infty}^{x} dF \geq \int_{-\infty}^{x} dG \, \forall x$$

As can be seen, the relation of magnitude between the values of the probability distribution functions is opposite to the order relation $\prec$. The order relation $\prec$ can be readily extended to multi-dimensional probability distributions. Also, the order relation between finite-dimensional probability vectors p and q, by considering them as discrete probability distributions, can be defined as $$p \prec q \Leftrightarrow \sum_{i=k}^{\infty} p_i \leq \sum_{i=k}^{\infty} q_i \, \forall k \quad (7)$$

For simplicity of notation, the same symbol will be used for the relation between probability density functions if the relation $\prec$ holds between their corresponding probability distributions.

For a given probability distribution F, its upper and lower bounds are respectively defined by probability distributions U and L, having the relation $$L \prec F \prec U$$

Under this definition, the following theorems hold. The validity of each of the following theorems has already been proved by the present inventor.

[Theorem 1]

When transition probability matrices obtained from Expression (3) by using the probability distribution F, its upper bound U, and lower bound L, are denoted by $M_F$, $M_U$, and $M_L$, respectively, the following equations given in the form of Expression (4) are solved.

$$M_L p_L = p_L$$

$$M_F p_F = p_F$$

$$M_U p_U = p_U$$

Then the results $p_L$, $p_F$, and $p_U$ satisfy the relation $$p_L \prec p_F \prec p_U$$

[Theorem 2]

For given probability density functions f, g, and h, the following relation holds.

$$f \prec g \Leftrightarrow f*h \prec g*h$$

where * denotes a convolution.

Using the above theorems, the upper and lower bounds for Expression (5) are obtained in the following sequence.

(1) With y,z fixed, the upper and lower bounds for x are obtained. That is $$L_{y,z}(x, y, z) \prec_x B(x, y, z) \prec_x U_{y,z}(x, y, z)$$

(2) For the respective upper and lower bounds, with z fixed, the upper and lower bounds for y are obtained. That is $$L_z(x, y, z) \prec_{x,y} B(x, y, z) \prec_{x,y} U_z(x, y, z)$$

(3) Then, the upper and lower bounds for z are obtained. That is $$L(x, y, z) \prec_{x,y,z} B(x, y, z) \prec_{x,y,z} U(x, y, z)$$

In employing the IPP model, it is assumed that the rate when the IPP model is ON corresponds to the peak rate p of the actual call source, and that the rate averaged by using the ON time $T_{ON}$ and OFF time $T_{OFF}$ of the IPP model corresponds to the average rate a of the actual call source, giving the relation $$a = p \times T_{ON}/(T_{ON} + T_{OFF}) \qquad (8)$$

Hence, by using the peak rate p and average rate a, the probability $P_{ON}$ of the IPP model being ON is given by $$P_{ON} = T_{ON}/(T_{ON} + T_{OFF}) = a/p \qquad (9)$$

Procedure (1)

The probability distribution of the number of arrivals, $a_r$, at time t, is determined solely by the arrival rate of each call source at that time and does not depend on the cell length $q_r$. In the IPP model, when a single call class is admitted, if the number of calls that are on at time t is m, the distribution, $a_r(i)$, of the number of arrivals at that time is the binomial distribution expressed by the following equation where the peak rate p of the call source is used.

$$a_r(i) = {}_mC_i p^i (1-p)^i \qquad (10)$$

In actuality, m is also a random variable, and the mean, mp, of the binomial distribution of Expression (10) is equal to the arrival rate $r_t$ at time t.

When multiple call classes are admitted, the distribution, $a_r(i)$, of the number of arrivals is equal to the convolution of the binomial distribution of Expression (10) calculated by using the peak rate p of each call class. In this case, the arrival rate $r_t$ is equal to the sum of mp's. To determine the upper and lower bounds of the probability distribution of the number of arrivals $a_t$ at a given arrival rate $r_t$, an operation of convolution will have to be performed on all possible combinations of m's of all call classes to determine the upper and lower bounds for them. This is not an easy process.

Figure 2:
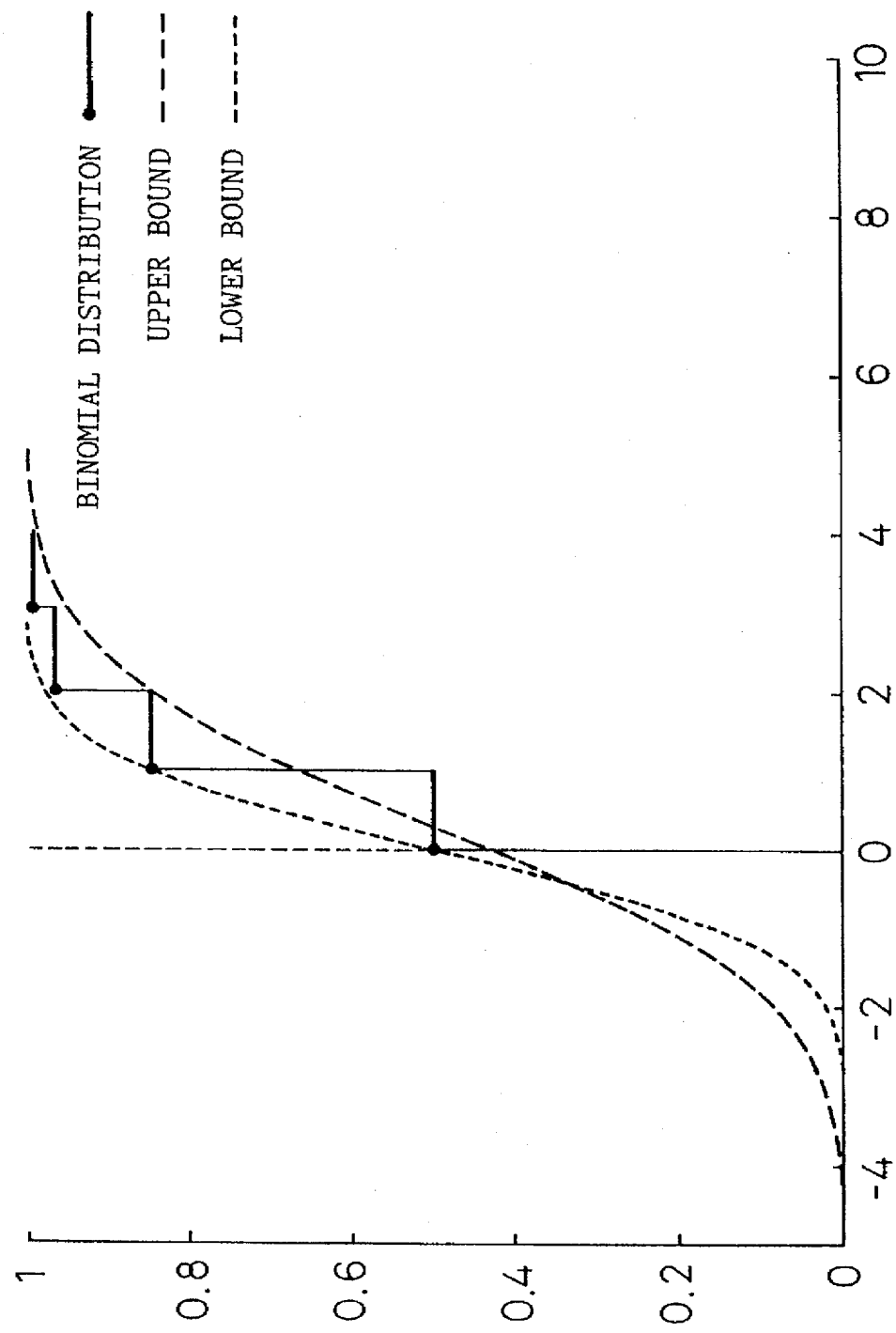
FIG. 2 is a diagram showing an example of a binomial distribution and an example of a distribution function for a normal distribution defining the upper and lower bound of the binomial distribution.

Therefore, the probability distributions that define the upper and lower bounds (for example, the normal distribution; as will be explained later, the Poisson distribution may also be used) are determined for each binomial distribution, and then, the upper and lower bounds of the arrival count distribution $a_r(i)$ at arrival rate $r_t$ are determined. More specifically, for each of the multiple call classes, the normal distributions defining the upper and lower bounds of the binomial distribution of Expression (10) are determined by numerical calculation for each possible value of the number of calls, m, from 1 to the expected maximum value within a single call class. That is, as shown in FIG. 2, the normal distribution passing under every value of the binomial distribution and closest to every value thereof is taken to determine the upper bound, and the normal distribution passing above every value of the binomial distribution and closest to every value thereof is taken to determine the lower bound. Next, as shown in a conceptual form in FIG. 3, the thus determined upper and lower bounds are plotted on a two-dimensional plane with the mean of each normal distribution (corresponding to the arrival rate $r_t$) being plotted along the abscissa and the variance along the ordinate, and their convex hulls are determined by numerical calculation. It is apparent that the normal distributions defining the upper and lower bounds of the arrival rate distribution in any given combination of call classes are contained in these convex hulls.

Accordingly, the boundaries of the convex hulls thus obtained define the upper and lower bounds of the distribution of the number of arrivals at a given arrival rate. For example, in FIG. 3, at arrival rate $r_0$ the normal distribution defining the upper bound is determined as having mean $r_0$ and variance $\sigma_1$, and the normal distribution defining the lower bound as having mean $r_0$ and variance $\sigma_2$.

Figure 3:
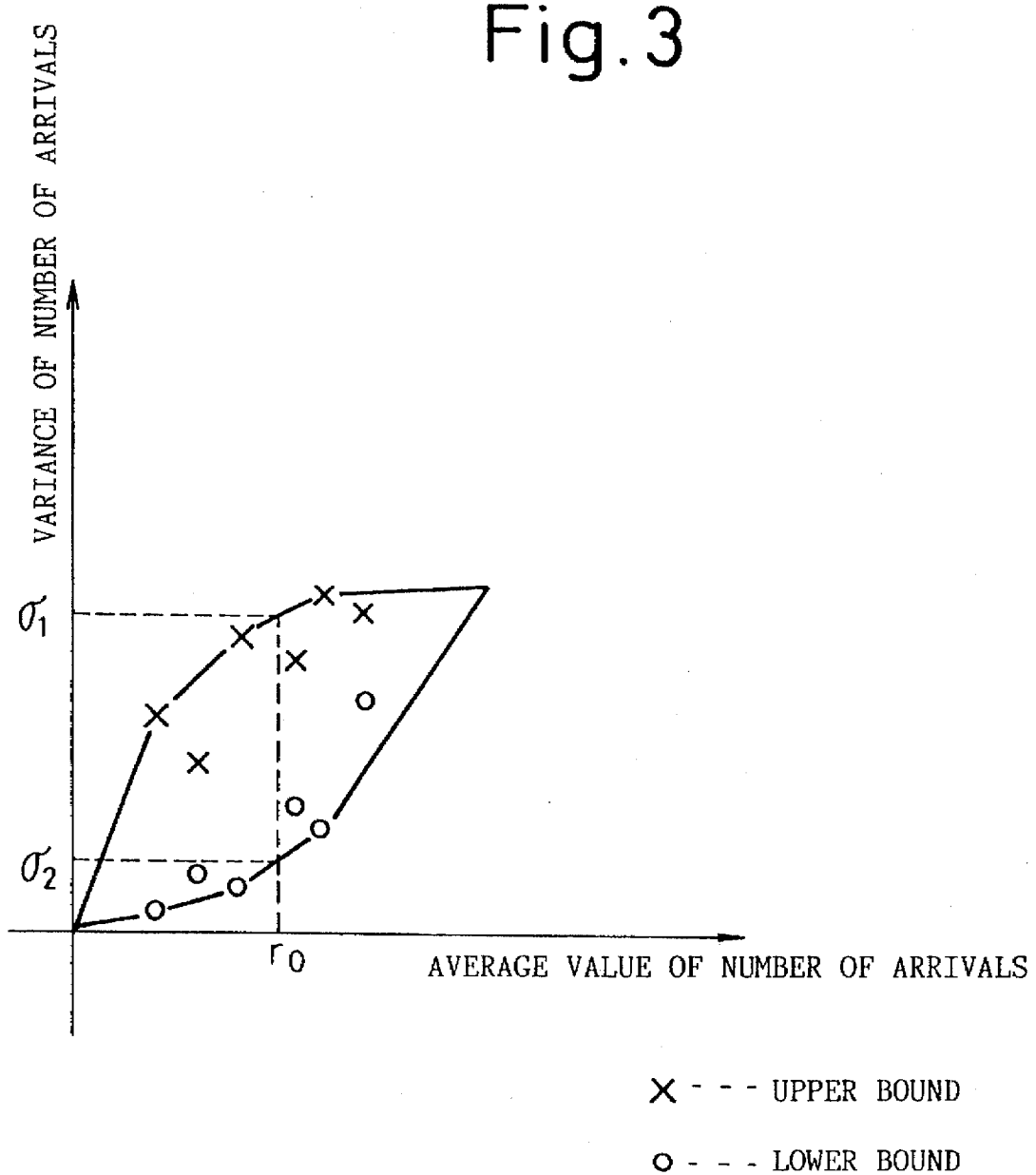
FIG. 3 is a conceptual diagram for explaining a method of determining the upper and lower bounds of the distributions of the number of arrivals.

The convex hull boundaries in FIG. 3 can be calculated once the characteristics and the maximum number of call classes expected for admission are determined. Therefore, these may be calculated offline and prestored in memory.

Procedure (2)

The arrival rate $r_t$ is determined solely by the number of actually admitted calls (hereinafter called the degree of multiplexing) and its characteristic. In the case of a single call class, if the degree of multiplexing is n, the distribution of the number, m, of call sources that are on is the binomial distribution expressed by $$_nC_m P_{ON}^m \cdot (1-P_{ON})^{n-m} \qquad (11)$$

Here, $P_{ON}$ is calculated from the peak rate p and average rate a of the call source by using Expression (9). Since the arrival rate r is equal to m×p, the distribution of the arrival rate r is also given by the binomial distribution $$_nC_{r/p} P_{ON}^{r/p} (1-P_{ON})^{n-r/p} \qquad (12)$$

The average arrival rate $r_0$ is calculated by the following equation.

$$r_0 = \Sigma n P_{ON} \times p = \Sigma na \qquad (13)$$

In the case of multiple call classes, the distribution of the arrival rate r is equal to the convolution of the binomial distribution of Expression (12) calculated by using the degree of multiplexing, n, and the peak rate, p, of each call class, and is therefore difficult to calculate. On the other hand, the convolution of the normal distributions that define their upper/lower bounds can be obtained just by summing their respective parameters; by [Theorem 2], the results define the upper/lower bounds of the overall arrival rate distribution.

Therefore, for each call class, the parameters of the normal distributions that define the upper and lower bounds of the binomial distribution of Expression (12) are calculated offline for each value of the degree of multiplexing, from 1 to the maximum possible value, and are prestored in the form of a table, as shown in FIG. 4. In evaluation, the parameters of the normal distributions defining the upper and lower bounds of the arrival rate distribution with regard to each call class are extracted on the basis of the degree of multiplexing of each call source in an admitted state which is to be evaluated, and the sum thereof is calculated to obtain the parameters of the normal distributions that define the upper and lower bounds of the distribution of the arrival rate $r_t$. Thus, the normal distributions defining the upper and lower bounds of the probability distribution of the arrival rate $r_t$ are determined at once, and the upper and lower bounds of the arrival count distribution $a_r(i)$ for each value on the distributions are quickly determined by referencing the results previously calculated and stored in Procedure (1).

Procedure (3)

In Procedures (1) and (2), the upper and lower bounds of the distribution of the arrival rate $r_t$ and the upper and lower bounds of the distribution, $a_t(i)$, of the number of arrivals $a_t$ for each value of the above-mentioned upper and lower bounds have been determined. Now, in Procedure (3), upper and lower bounds are determined for the cell length distribution $q_t$ resulting from the arrival count distribution along these upper and lower bounds.

When a burst within a given period of time is allowable, if a burst persists within the allowable time, a buffer overflow may occur as seen in Expression (1). It is therefore necessary to evaluate the persistence of a burst. In Procedures (1) and (2), once the arrival rate $r_t$ is determined, the upper and lower bounds of the distribution of the number of arrivals at that time can be determined. Therefore, by evaluating the dependence of the arrival rate $r_t$ on time, the persistence of a burst can be evaluated.

When the time series of the arrival rate $r_t$, a random variable, from time 0 to time t is expressed as $\{r_t\}=r_0, r_1, \ldots, r_t$, and the transition probability matrices obtained by substituting the distribution of the number of arrivals at the respective times into Equation (3) are denoted by $M_0, M_1, \ldots, M_t$, then from Equation (2) the cell length distribution $q_t$ at time t is expressed as $$q_t = M_t \ldots M_1 M_0 q_0 \quad (14)$$

That is, the cell length distribution $q_t$ at time t is uniquely determined by the cell length distribution $q_0$ at time $t=0$ and the time series $\{r_t\}$. Since it can be safely assumed that the buffer is empty at $t=0$, the cell length distribution $q_t$ at time t can be obtained by calculating Expression (14) for every possible time series $\{r_t\}$ for the initial cell length distribution $q_0 = [0, \ldots 0]^t$, and by taking the average of the resulting cell length distributions $q_t$ at time t by using the probability of occurrence of each time series.

In practice, however, the number of possible time series $\{r_t\}$ is enormous, and it is extremely difficult to carry out the process as stated above.

According to the algorithm of the invention, the upper and lower bounds of the cell length distribution $q_t$ are calculated by using the following technique.

First, the following order relation is defined between two time series $\{r_t\}, \{s_t\}$.

$$\{r_t\} \prec \{s_t\} \leftrightarrow r_u \leq s_u \quad 0 \leq \forall u \leq t$$

From this definition, it is clear that the following [Theorem 3] holds.

[Theorem 3]

When the cell length distributions at time t resulting from time series $\{r_t\}, \{s_t\}$ are $q_t(\{r_t\}), q_t(\{s_t\})$, respectively, if the order relation $$\{r_t\} \prec \{s_t\}$$

holds, then $$q_t(\{r_t\}) \prec q_t(\{s_t\})$$

If the weighted sum of the two time series is defined as $$\alpha\{r_t\} + \beta\{s_t\} \leftrightarrow \{\alpha r_t + \beta s_t\}$$

the following [Theorem 4] holds.

[Theorem 4]

$q_t$ is convex with respect to the weighted sum of time series. In other words, with $\alpha + \beta = 1$, when $q_t$ is evaluated by using the upper bound of the distribution of the number of arrivals for each arrival rate value within time series $\{r_t\}, \{s_t\}$, then the following relation holds.

$$\alpha q_t(\{r_t\}) + \beta q_t(\{s_t\}) \prec q_t(\alpha\{r_t\} + \beta\{s_t\})$$

If $q_t$ is evaluated by using the lower bound, the following relation holds.

$$q_t(\alpha\{r_t\} + \beta\{s_t\}) \prec \alpha q_t(\{r_t\}) + \beta q_t(\{s_t\})$$

That is, the cell length distributions obtained from the sum of time series, $\alpha\{r_t\} + \beta\{s_t\}$, define the upper and lower bounds of the weighted sum of the cell count distributions obtained from the respective time series $\{r_t\}, \{s_t\}$.

Furthermore, from Jensen's theorem, for the upper bound the following relation holds $$E(q_t) \prec q_t(E(\{r_t\}))$$

and for the lower bound, the following relation holds $$q_t(E(\{r_t\})) \prec E(q_t)$$

That is, the cell length distribution $q_t(E(\{r_t\}))$, which is obtained by using the upper bound or lower bound of the distribution of the number of arrivals determined sequentially in accordance with the mean time series $E(\{r_t\})$, provides the upper bound or lower bound of the weighted mean $E(q_t)$ of the cell length distribution resulting from every possible time series.

Figure 5:
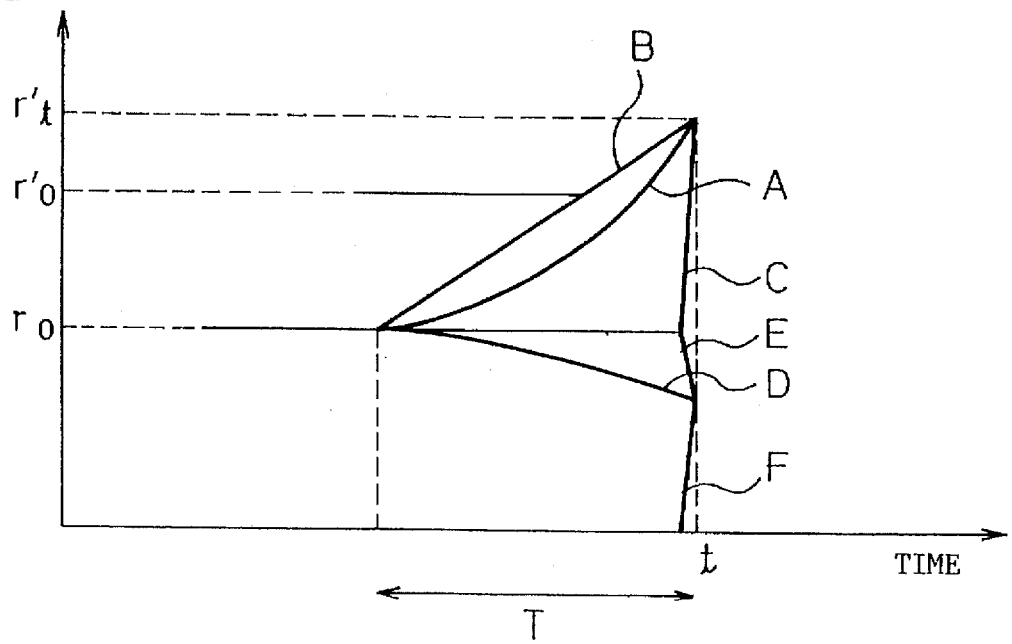
FIG. 5 is a conceptual diagram showing upper and lower bounds for the time series of the arrival rate.

Next, when the maximum value of burst duration time is T, a burst currently in progress at time t is expected to end in T, and the occurrence of a burst after T is expected to be independent. Looking back along the time axis, suppose that a burst started T before current time t, as shown in FIG. 5. Then, it can be considered that the mean time series before that time had been constant at the mean $r_0$ of the arrival rate (see Expression (13)), and after the burst started, made a transition with a mean time series along curve A, reaching the arrival rate $r_t$ at time t.

Further, the mean time series A, where the arrival rate $r_t$ at current time t is larger than the mean arrival rate $r_0$, lies below a time series B which makes a linear transition from $r_0$ to $r_t$ during T time. That is, $a \prec B$ holds. Also, for a time series C which is constant at the arrival rate $r_0$ until time $t-1$ and makes a transition to $r_t$ at time t, $C \prec A$ holds. For a mean time series D for which $r_t$ is smaller than $r_0$, the relation $$F \prec D \prec E$$

holds with respect to a time series E, which is constant at $r_0$ until time $t-1$ and makes a transition to $r_t$ at time t, and a time series F, which is at 0 until time $t-1$ and makes a transition to $r_t$ at time t.

When the time series B, C, E, and F to be calculated are determined as described above, the resultant cell length distribution $q_t$ can be calculated. For example, to determine the time series B, a time series that changes linearly from $r_0$ to $r_t$ during T time is determined, and by using the same the upper bound of the distribution of the number of arrivals, $a_t(i)$, is determined by referencing the results obtained in Procedure (1); after that, the transition probability matrices $M_0, M_1, M_2 \ldots$ are determined from Expression (3), the cell length distribution in an equilibrium state is determined from Equation (4) by using $M_0$, and the cell length distribution $q_t$ is determined by sequentially applying $M_1, M_2, \ldots$ in accordance with Expression (2). If the calculation time is to be reduced at some sacrifice of precision, a time series that starts from the arrival rate $r_0'$ midway through the straight line B is used. For other time series, calculations can be performed in a further simple way using a similar procedure. However, for the calculation of the time series C and F, the lower bound of the arrival count distribution $a_r(i)$ is used.

The above processing is performed for each appearance value r of $r_t$ to calculate the cell length distribution $q_r(r)$, and using the appearance probability $f(r)$ at the upper or lower bound of the arrival rate distribution obtained in Procedure (2), a weighted addition is performed, as shown in the following equation, to obtain the upper or lower bound of the cell length distribution.

$$q_t = \Sigma f(r) \cdot q_r(r)$$

The approximation of the time series E and F used on the side where r is smaller than $r_0$ may seem too rough, but in a real system, since the average arrival rate is close to 0, the value of $f(r)$, when the arrival rate r is smaller than $r_0$, is small and has little effect on the calculation result.

Figure 9:
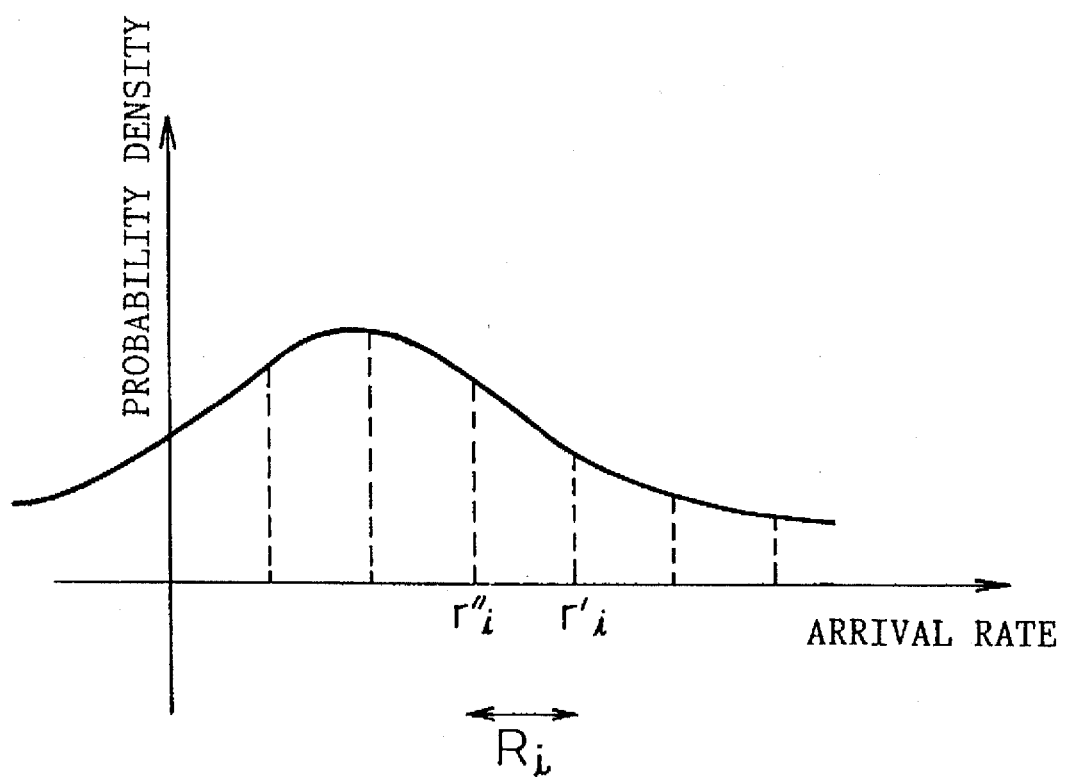
FIG. 9 is a conceptual diagram for explaining the quantization of the upper and lower bounds of the arrival rate distribution.

Each appearance value r of $r_t$ has been described as being a discrete value. However, the upper and lower bounds of the arrival rate distribution obtained in Procedure (2) are each a normal distribution in continuous form as shown in FIG. 9. This continuous distribution is quantized into a plurality of sections. For example, for section $R_i$ with arrival rate r, the largest value $r_i'$ in that section is used to calculate the upper bound, and the smallest value $r_i''$ is used to calculate the lower bound. The integrated value of section $R_i$ is used as the weighting factor $f(r)$.

The amount of calculation required in the above procedures can be evaluated as follows. Excluding the portion that can be calculated offline, the only calculation required in Procedure (2) is to sum the mean values and variances for the convolution of the normal distributions. Therefore, if the number of call sources is N, this means the amount of work equal to O(N) at most. In Procedure (3), if the number of discrete sections is M, it is only necessary to solve a linear equation of size (K+1)×(K+1) a few times, which means the amount of calculation required in Procedure (3) is $O(MK^3)$ at most.

When calculating the upper and lower bounds for a case where the realization value r of the arrival rate $r_t$ is larger than the average arrival rate $r_0$, the spacing between the upper and lower bounds can be further narrowed by using the time series hereinafter described instead of the time series B and C shown in FIG. 5.

Figure 6:
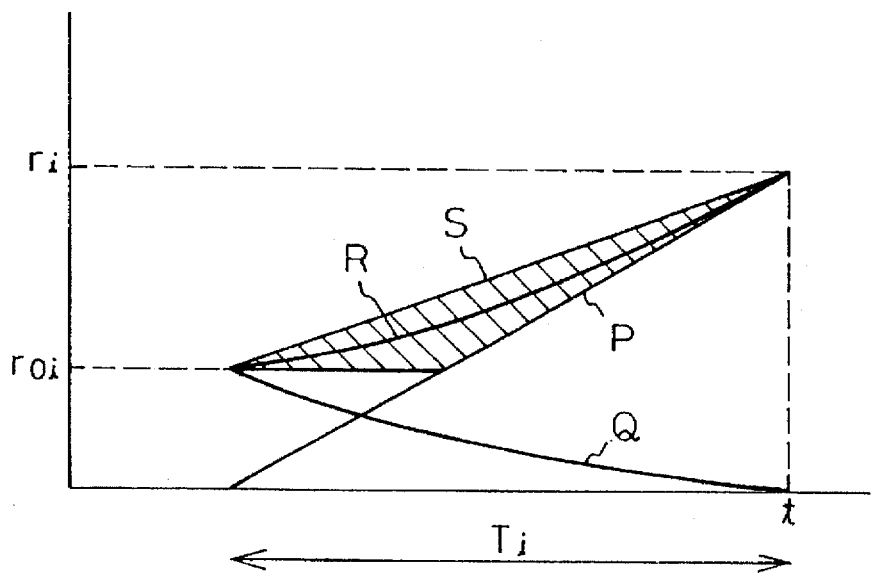
FIG. 6 is a conceptual diagram showing upper and lower bounds for the time series of the arrival rate when there is only a call class of burst duration time $T_i$.

Call classes admitted are classified according to the specified value of the burst duration time, and contributions from the respective values are considered. First, we will consider the contribution only from the call class for which the burst duration time is specified at $T_i$. If it is assumed that each burst is independent and the phases of respective bursts are random, the probability of a burst terminating at each time is constant; therefore, excluding bursts newly occurring, the average arrival rate of the call class of burst duration time $T_i$ decreases linearly from value $r_i$ at time t. If this is illustrated by reversing the direction of the time axis as in FIG. 5, the result will be the straight line P of slope $r_i/T_i$ shown in FIG. 6. In the meantime, new bursts will occur as shown by a curve Q. Adding these together, the average arrival rate will vary along a curve R from $r_i$ to the average arrival rate $r_{0i}$.

The shape of the curve Q is clearly known in some cases, and is not known in other cases. In either case, when the burst length is limited to the upper limit $T_i$, it is clear that the mean time series of the arrival rate passes through the area indicated by oblique hatching enclosed by the straight line P of slope $r_i/T_i$ and the straight line S of slope $(r_i-r_{0i})/T_i$.

Figure 7:
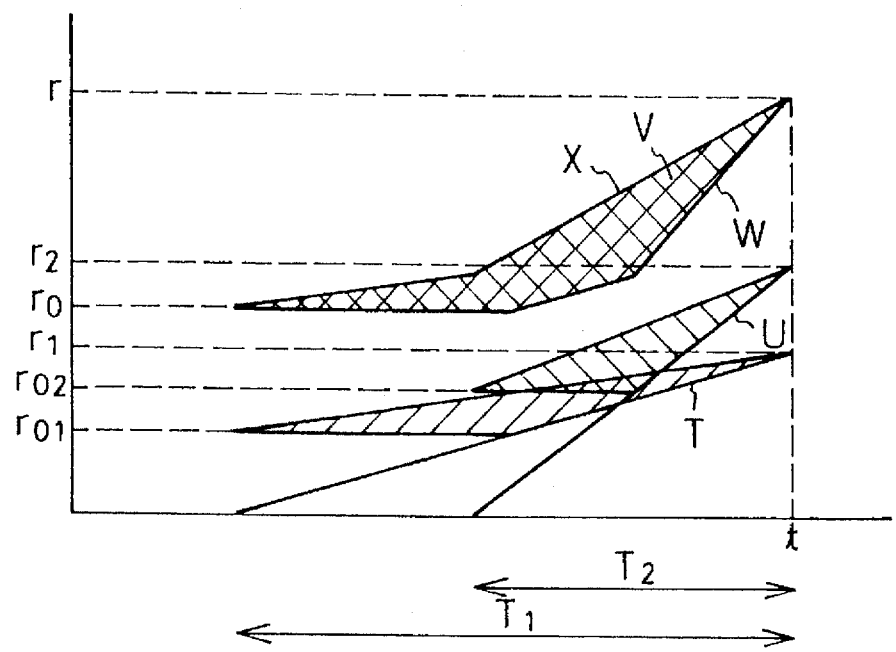
FIG. 7 is a conceptual diagram showing upper and lower bounds for the time series of the arrival rate when there are a call class of burst duration time $T_1$ and a call class of burst duration time $T_2$.

When there are two call classes, one with burst duration time $T_1$ and the other with $T_2$, the mean time series passes through an area V, i.e., the sum of two triangular areas T and U obtained for the respective call classes, as shown in FIG. 7. More specifically, the mean time series passes above a straight line W of slope $r_1/T_1+r_2/T_2$, and near time t and inside the smaller burst duration time section $T_2(T_1>T_2)$, passes below a straight line X of slope $(r_1-r_{01})/T_1+(r_2-r_{02})/T_2$. Here, $r_1$ and $r_2$ denote contributions to the realization value r of the arrival rate at time t for the call classes of burst duration $T_1$ and $T_2$, respectively, and $r_{01}$ and $r_{02}$ denote the contribution to the average arrival rate $r_0$.

Figure 8:
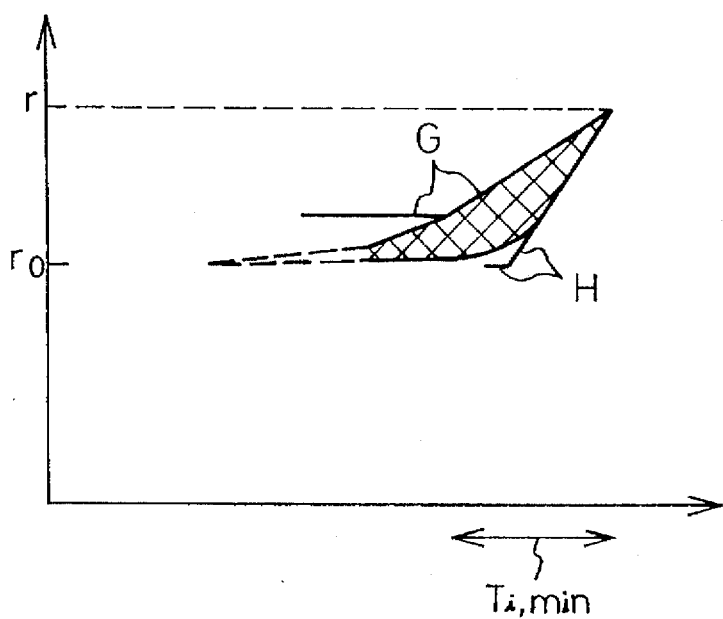
FIG. 8 is a conceptual diagram showing an upper bound G and a lower bound H for the time series of the arrival rate.

To generalize the above description, when call classes of burst duration times, $T_1, T_2, \ldots, T_i, \ldots$ are admitted, the mean time series passes above a straight line of slope $\Sigma r_i/T_i$, and near time t and inside the time section corresponding to the smallest value of $T_1, T_2, \ldots, T_i, \ldots$, passes below a straight line of slope $\Sigma(r_i-r_{0i})/T_i$. Therefore, as shown in FIG. 8, a time series H starting at the mean time series $r_0$ and reaching r with slope $\Sigma r_i/T_i$ is used to calculate the lower bound; on the other hand, to calculate the upper bound, a time series G varying with slope $\Sigma(r_i-r_{0i})/T_i$ inside the time section of $T_{i,min}$ and reaching r is used, where $T_{i,min}$ is the smallest burst duration time. In this manner, the upper and lower bounds with a narrower spacing can be obtained than when using the time series B and C.

The upper and lower limits of the contribution $r_i$ to the realization value r of the arrival rate at time t from each call source of burst duration time $T_i$ are calculated as $$r_i = \mu_i + (r-\mu)\sigma_i^2/\sigma^2$$

where $\mu_i$ and $\sigma_i^2$ are the sums of the mean values and variances, respectively, of the normal distribution of the upper or lower bound of the arrival rate distribution, read out of the table of FIG. 4 for call classes of burst duration time $T_i$, and $\mu$ and $\sigma^2$ are the sums of all i's in $\mu_i$ and $\sigma_i^2$, respectively. Also, $r_{0i}$ is equal to $\mu_i$, and $r_0$ is equal to $\mu$.

Therefore, the slope k of the time series of the upper and lower bounds is calculated as $$k = c_1(r-r_0) \qquad \text{(Upper bound)}$$

$$k = c_0 + c_1(r-r_0) \qquad \text{(Lower bound)}$$

where $$c_0 = \Sigma \mu_i/T_i$$

$$c_1 = (\Sigma \sigma_i^2/T_i)/\sigma^2$$

Evaluation of QOS parameters

In Procedures (1) to (3), the upper and lower bounds of the arrival count distribution and the upper and lower bounds of the cell length distribution, for each appearance value r of arrival rate $r_t$ at time t, have been determined, and also, the probability $f(r)$ of the appearance value r appearing on the upper and lower bounds of the probability distribution of the arrival rate $r_t$ has been determined. From these results, the upper and lower bounds of the cell length distribution weighted by $f(r)$ as shown by Expression (15), for example, are determined. Now, using a similar procedure, the upper and lower limits $Q_U$, $Q_L$ of the average cell length Q, the upper and lower limits $D_U$, $D_L$ of the average delay D, the expected value S of the number of arriving cells, the upper and lower limits $L_U$, $L_L$ of the number of lost cells, and the upper and lower limits $R_U$, $R_L$ of the cell loss rate R will be determined. We will first explain the upper and lower limits of parameter values Q(r), D(r), S(r), L(r), and R(r) for a certain appearance value r of the arrival rate $r_t$, and then deal with their mean values weighted by $f(r)$.

For the average cell length Q, the following relation holds $$Q = \sum_{i=0}^{k} i q_i \qquad (16)$$

where $q_i$ (i=0, 1, ..., K) represents each element in the vector $q_r$ of the cell length distribution. According to Expression (16), the upper, lower limit $Q_{U,L}(r)$ of the average cell length Q(r) when the appearance value of the arrival rate $r_r$ is r, is calculated as $$Q_{U,L}(r) = \sum_{i=0}^{k} i q_i(r)$$

where $q_i(r)$ represents each element in the vector of the upper, lower bound of the cell length distribution obtained in Procedure (3) when the arrival rate is r. $Q_U(r)$ is obtained by using the upper bound, and $Q_L(r)$ by using the lower bound. Therefore, the upper and lower limits of the average cell length Q is obtained by $$Q_{U,L} = \Sigma f(r) Q_{U,L}(R) \qquad (17)$$

where f(r) for the upper bound is used for $Q_U(r)$, and f(r) for the lower bound is used for $Q_L(r)$.

For the average delay D, the relation D=Q×Δt holds (where Δt is the reciprocal of the outgoing line rate, i.e., the unit time defined before), and therefore, the upper and lower limits are calculated as $$D_{U,L} = Q_{U,L} \times \Delta t \qquad (18)$$

The expected value S(r) of the number of arriving cells at arrival rate r is the arrival rate r itself, so S is the average arrival rate $r_0$ itself. Therefore, S(r) and S can be expressed as $$S(r) = r \qquad (19)$$

$$S = r_0 \text{ (see Expression (13))} \qquad (20)$$

If the probability $q_r(i)$ of cell length $q_r$ being i and the probability $a_r(j)$ of the number of arrivals $a_r$ being j are known, then the expected value L of the number of lost cells is expressed as $$L = \sum_{i+j>K} q_r(i) a_r(j) \cdot (i+j-K) \qquad (21)$$

The summation denoted by Σ in Expression (21) is performed on all possible combinations of i and j (i=0, 1, ..., K, j=0, 1, ..., n) that satisfy i+j>K. Since the upper and lower bounds for the probability distribution of the cell length and the probability distribution of the number of arrivals, when the appearance value r of the arrival rate is given, are already determined, these values are substituted into Expression (21) to obtain the upper, lower limits $L_{U,L}(r)$ of the number of lost cells at arrival rate r. Further, the upper, lower limits $L_{U,L}$ of the number of lost cells are obtained by $$L_{U,L} = \Sigma f(r) \cdot L_{U,L}(r) \qquad (22)$$

For the cell loss rate R, the relation is R=L/S Therefore, its upper and lower limits are determined as $$R_{U,L}(r) = L_{U,L}(r)/r$$

$$R_{U,L} = \Sigma f(r) \cdot R_{U,L}(r)$$

As explained in Procedure (3), in FIG. 9, $r_i'$ is used as the value of r to calculate the upper bound, $r_i''$ as the value of r to calculate the lower bound, and the integrated value of the section $R_i$ of the upper or lower bound is used as the value of f(r).

Furthermore, since $Q_{U,L}(r)$ and $R_{U,L}(r)$ can be precalculated for all possible combinations of average arrival rate $r_0$ and slope k of the time series of the upper and lower bounds, if these are calculated offline and prestored as a table, the online calculation time can be further reduced.

In an actual process, the values of $r_0$ and k are taken at prescribed intervals, and $Q_{U,L}(r)$ and $L_{U,L}(r)$ are calculated for each value and stored in the table. The interval is determined in consideration of a trade-off between the precision of calculation and the memory capacity required for storing the table. Using this table as well as the table (FIG. 3) containing the results of Procedure (2), each QOS parameter is calculated in the following sequence.

i) By referencing the table of FIG. 4 using the degree of multiplexing of each call class in the call admitted state under evaluation, the parameters of the normal distributions of the upper and lower bounds for the arrival rate distribution with regard to each call class are read out, and added together for the call classes whose burst duration time is specified at the same value $T_i$, to obtain $\mu_i$ and $\sigma_i$.

ii) From the values of $\mu_i$, $\sigma_i$, and $T_i$, $c_i$ is calculated for the upper bound, and $c_0$, $c_1$ for the lower bound.

iii) From $c_0$ and $c_1$, the slope k of the time series of the upper/lower bounds is calculated for each value of r.

iv) By referencing the table using the values of $r_0$ and k, the values of $Q_{U,L}(r)$ and $L_{U,L}(r)$ are read out.

v) Using the value f(r) of the normal distribution determined by $\mu(=\Sigma\mu_i)$ and $\sigma^2(\Sigma\sigma_i^2)$, $Q_{U,L}(r)$ and $L_{U,L}(r)$ are integrated to calculate $Q_{U,L}$, $L_{U,L}$, and other parameters.

Using this algorithm, QOS evaluation can be performed for each priority class in a system where pushout type priority call control is performed. When evaluating the QOS for the call class whose priority P is $P_0$, call classes whose priority P is lower than $P_0$ ($P_0$>P) can be neglected in the pushout system. Therefore, analysis according to this algorithm is performed for a set of calls whose priority P is higher than or equal to $P_0$ (P≥$P_0$), and the upper limit value $L_U\{P \geq P_0\}$ and lower limit value $L_L\{P \geq P_0\}$ of the number of lost cells, having the relation shown below, are obtained.

$$L_L\{P \geq P_0\} \leq L\{P \geq P_0\} \leq L_U\{P \geq P_0\} \qquad (23)$$

L{P≥$P_0$} can be expressed as $$L\{P \geq P_0\} = L\{P = P_0\} + L\{P > P_0\} \qquad (24)$$

Similarly, for a set of call classes whose priority P is higher than $P_0$ (P>$P_0$), the same analysis is performed, and $L_U\{P>P_0\}$ and $L_L\{P>P_0\}$ having the following relation are obtained.

$$L_L\{P > P_0\} \leq L\{P > P_0\} \leq L_U\{P > P_0\} \qquad (25)$$

From Expressions (23), (24), and (25)

$$L_L\{P \geq P_0\} - L_U\{P > P_0\} \leq L\{P = P_0\} \leq L_U\{P \geq P_0\} - L_L\{P > P_0\}$$

If the upper and lower bounds are sufficiently tight, both sides of the above inequality are positive, and the following relation is obtained for the cell loss rate R{P=$P_0$}=L{P=$P_0$}/S{P=$P_0$} for the calls of priority $P_0$.

$$\frac{L_L\{P \geq P_0\} - L_U\{P > P_0\}}{S\{P = P_0\}} \leq R\{P = P_0\} \leq \frac{L_U\{P \geq P_0\} - L_L\{P > P_0\}}{S\{P = P_0\}} \quad (26)$$

where $S\{P=P_0\}$ is the result of Expression (13) for the calls of priority class $P_0$.

Using Expression (26), the upper and lower limits of the cell loss rate R can be obtained for each priority class; for example, it is possible to evaluate whether the cell loss rate in each priority class, especially the cell loss rate of a call of low priority, will be able to satisfy the specified value, when a call requesting a connection will be admitted. If evaluation is not to be performed on a priority class basis, there is no need to obtain the lower limit values of QOS, and therefore, no processing for the lower bounds is required. Instead of just rejecting the admission of a call when the specified value is not satisfied, the system may be configured so that QOS values when the call will be admitted, are notified to the caller, leaving the decision to the caller. Furthermore, the system may be so configured that the amount of traffic that can be admitted is calculated with regard to each of a plurality of call classes presented by the caller and the resulting value is notified to the caller, enabling the caller to quickly select an appropriate call class.

Figure 10:
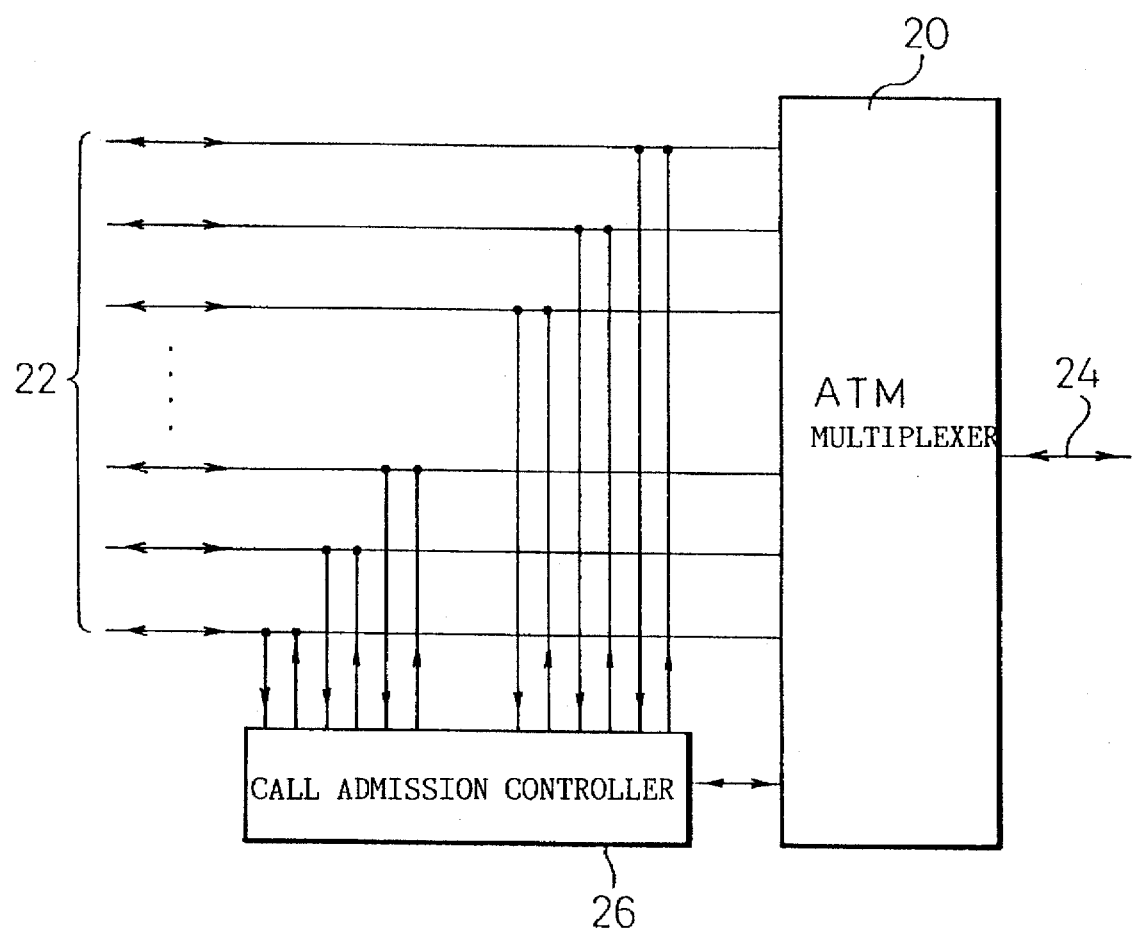
FIG. 10 is a schematic block diagram showing the configuration of an ATM transmission system containing a call admission control apparatus according to the invention.

FIG. 10 is a schematic block diagram showing the configuration of an ATM transmission system containing the call admission control apparatus of the present invention. An ATM multiplexing apparatus 20 statistically multiplexes ATM cells from a large number of subscriber lines 22 and transmits them out over a multiplexed transmission line 24. On the other hand, ATM cells received from the multiplexed transmission line 24 are demultiplexed by the ATM multiplexing apparatus 20 for distribution to respective subscriber lines 22. The call admission control apparatus 26 receives a call connection request from each subscriber line 22, evaluates QOS parameters in accordance with the aforementioned procedure to determine whether the call is admittable, and if judged as being admittable, directs the ATM multiplexing apparatus 20 to set up the necessary connection.

Figure 11:
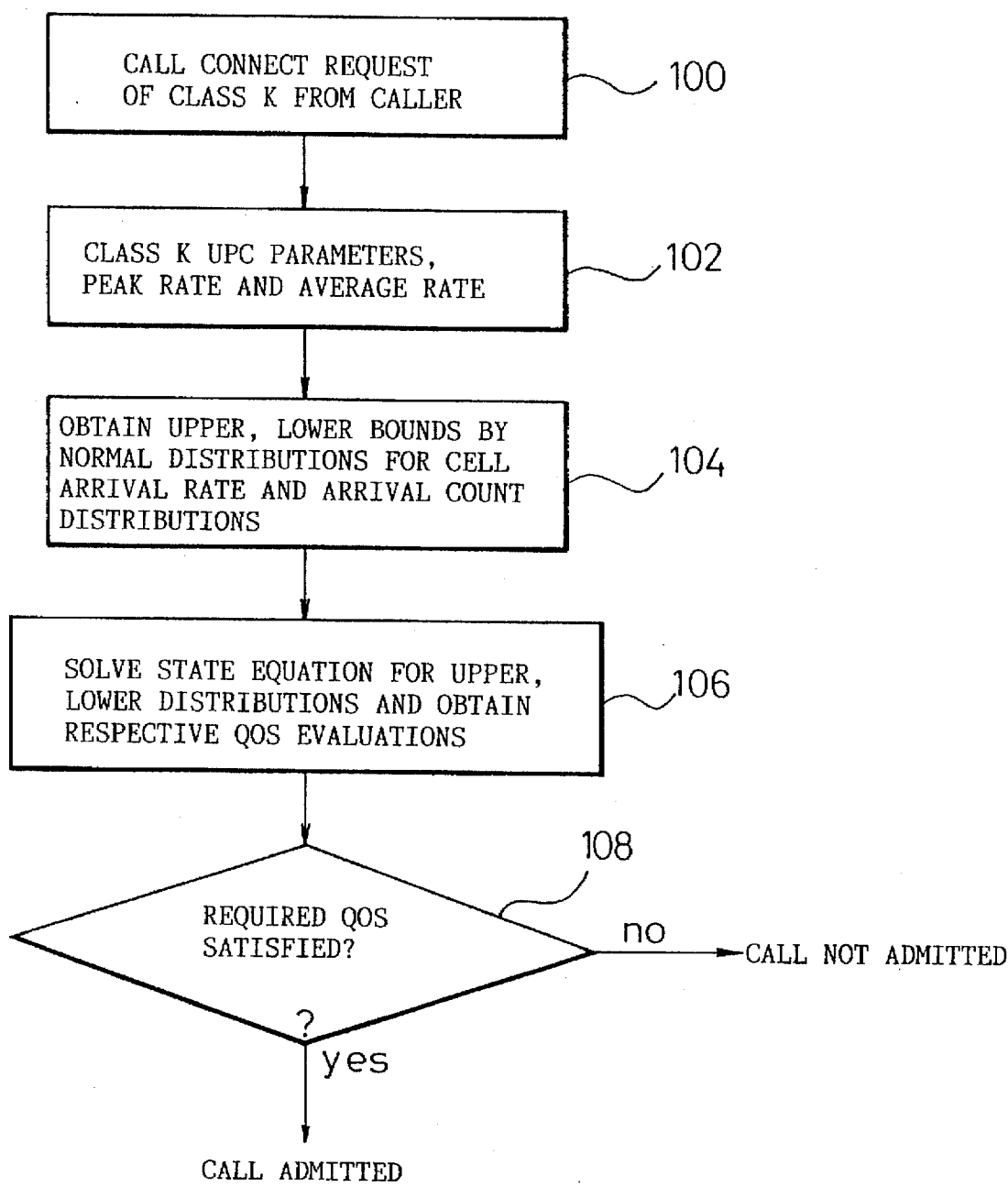
FIG. 11 is a flowchart illustrating the processing performed in the call admission control apparatus according to the invention.

FIG. 11 is a flowchart outlining the call admission determining procedure performed in the call admission control apparatus 16. When there is a call connection request of priority class K from a caller (step 100), the control apparatus 26 receives the values of peak rate p and average rate a, i.e., the UPC parameters thereof (step 102), and by referencing the table prestored in the form shown in FIG. 4, extracts data for each call class in the call admitted state under evaluation and sums the extracted data to determine the upper and lower bounds of the probability distribution of the arrival rate $r_r$, as described in Procedure (2). In this case, the calls already admitted and the call requested for connection, together, are evaluated; when the QOS parameters are to be calculated on a priority class basis, the upper and lower bounds of the arrival rate distribution are determined for each set of calls as previously described. Further, the time series of the arrival rate, as described in Procedure (3), are determined, and by referencing the data created and stored in memory in Procedure (1) for respective values, the upper and lower bounds of the distribution of the number of arrivals are determined (step 104). Next, the linear equation described in Procedure (3) is solved for each time series, and by sequentially applying the matrix, the cell length distribution is calculated, and summation is performed with the probability density at the upper and lower bounds of the arrival rate distribution as a weight, to obtain the upper and lower bounds for the cell length distribution. From these values, QOS parameters are calculated (step 106). When the resulting value satisfies the specified QOS, the call is admitted, but when it does not satisfy the specified QOS, the call is not admitted (step 108). When $Q_{U,L}$ (r) and $L_{U,L}$ (r) are prestored in the form of a table, the previously described processing steps i) to iv) are followed instead of steps 104 and 106.

Figure 18:
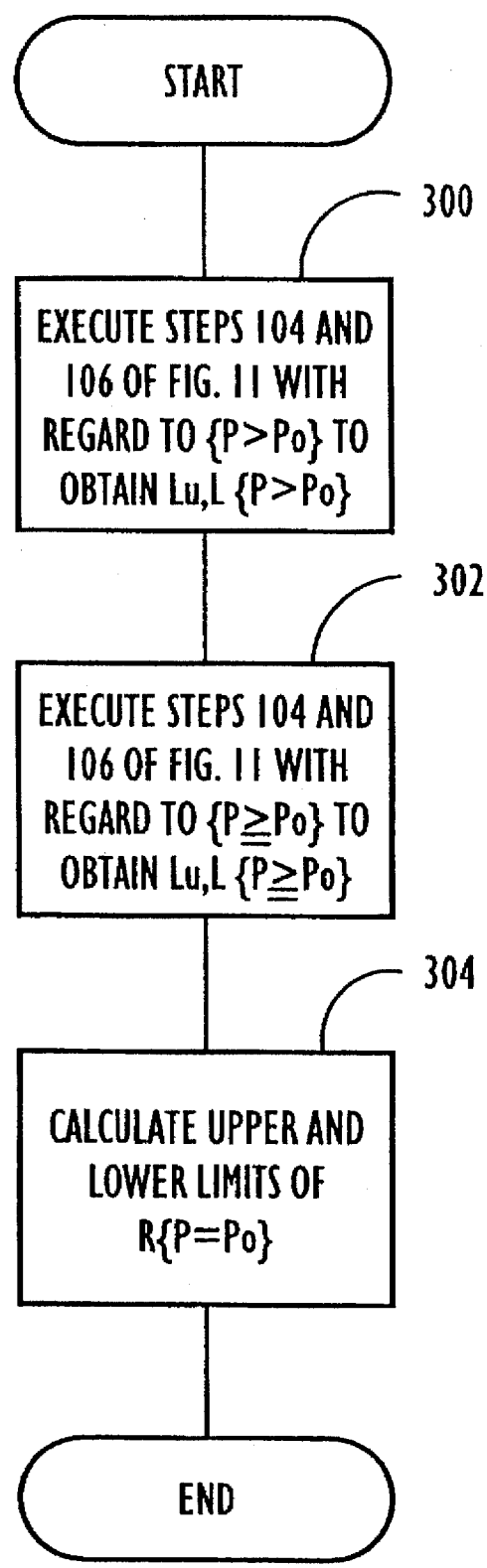

FIG. 18 shows a procedure for calculating the upper and lower limits of the cell loss rate R for each priority class $P_0$. In FIG. 18, steps 104 and 106 of FIG. 11 are executed with regard to calls whose priority P is higher then $P_0$, to obtain $L_U\{P>P_0\}$ and $L_L\{P>P_0\}$ in step 300. Similarly, steps 104 and 106 are executed with regard to calls whose priority P is higher than or equal to $P_0$, to obtain $L_U\{P \geq P_0\}$ and $L_L\{P \geq P_0\}$, in step 302. In step 304, upper and lower limits of the call loss rate for priority class $P_0$ are calculated by using Expression (26).

The call admission control apparatus 26 for performing the above processing can be implemented using a microcomputer of known configuration comprising a microprocessor, nonvolatile memory (ROM), random access memory (RAM), and input/output interface.

In the above embodiment, the data are stored in a nonvolatile memory, but in a configuration having a disk drive, data may be stored on a disk. As a processor, a special processor suitable for execution of the call admission determining algorithm or a dedicated processor capable of performing floating-point calculations at high speed may be combined instead of using a general-purpose microprocessor.

Furthermore, instead of providing an independent call admission control apparatus as in the above-described configuration, the function as provided in the present embodiment may be implemented by using part of an existing control function used in the ATM multiplexing apparatus or switching equipment or by using a general-purpose work station.

The above embodiment uses tables, but instead of such tables, a more suitable data structure having a similar function, such as a binary tree or priority queue structure, may be employed.

Determining the upper and lower bounds for the binomial distribution

In Procedures (1) and (2), when determining the upper and lower bounds of the binomial distribution, which is a discrete distribution, the normal distribution, which is a continuous distribution, is converted into a discrete distribution by quantizing it at appropriate intervals, and the distribution passing under or above the binomial distribution and closest to it is selected to determine the upper or lower bound. This will not present a particular problem in Procedure (2), except that the numerical calculation algorithm has some room for improvement in terms of efficiency, but Procedure (1) requires some precaution. Since the normal distribution has two parameters, mean and variance, the mean (which is equal to the arrival rate) of the arrival count distribution at the upper and lower bounds determined by the boundaries of convex hulls when the arrival rate is given must coincide in order to enable the convex hulls to be determined on a two-dimensional plane; that is, the mean values of the discretized normal distributions defining the upper and lower bounds of the arrival rate distribution determined from one binomial distribution, must coincide with each other.

Such a relation is also established in the example shown in FIG. 2. This example is shown in the form of a density function (probability function) in FIG. 12.

Figure 12:
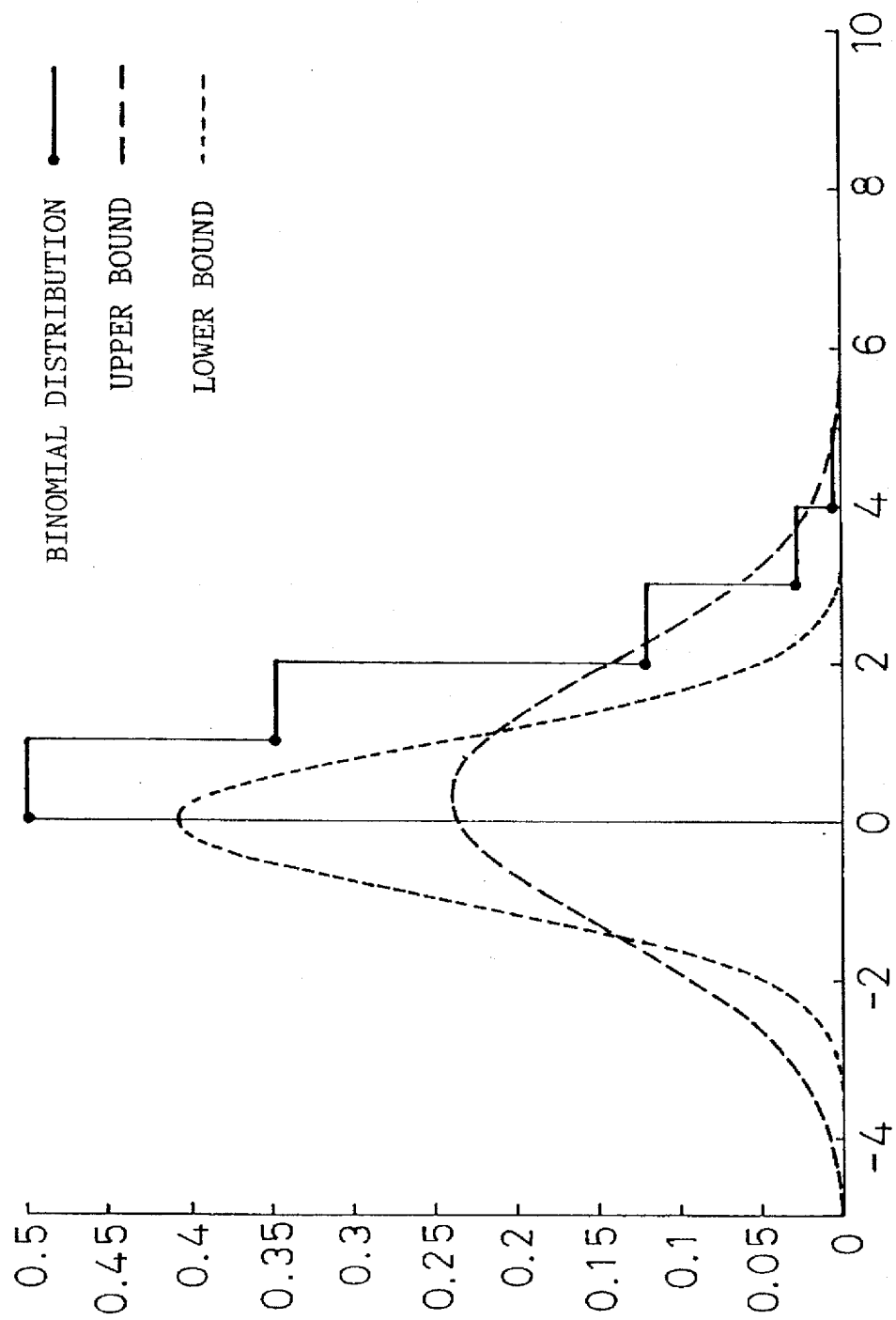
FIG. 12 is a diagram showing a probability function corresponding to the distribution function shown in FIG. 2.

However, as shown in FIG. 12, when the arrival rate is small, the binomial distribution is rather close to the Poisson distribution and is asymmetric about the center. Therefore, if the upper and lower bounds are each determined simply by using one normal distribution, the accuracy of approximation does not increase, and in some cases, such a curve just cannot be found.

Figure 13:
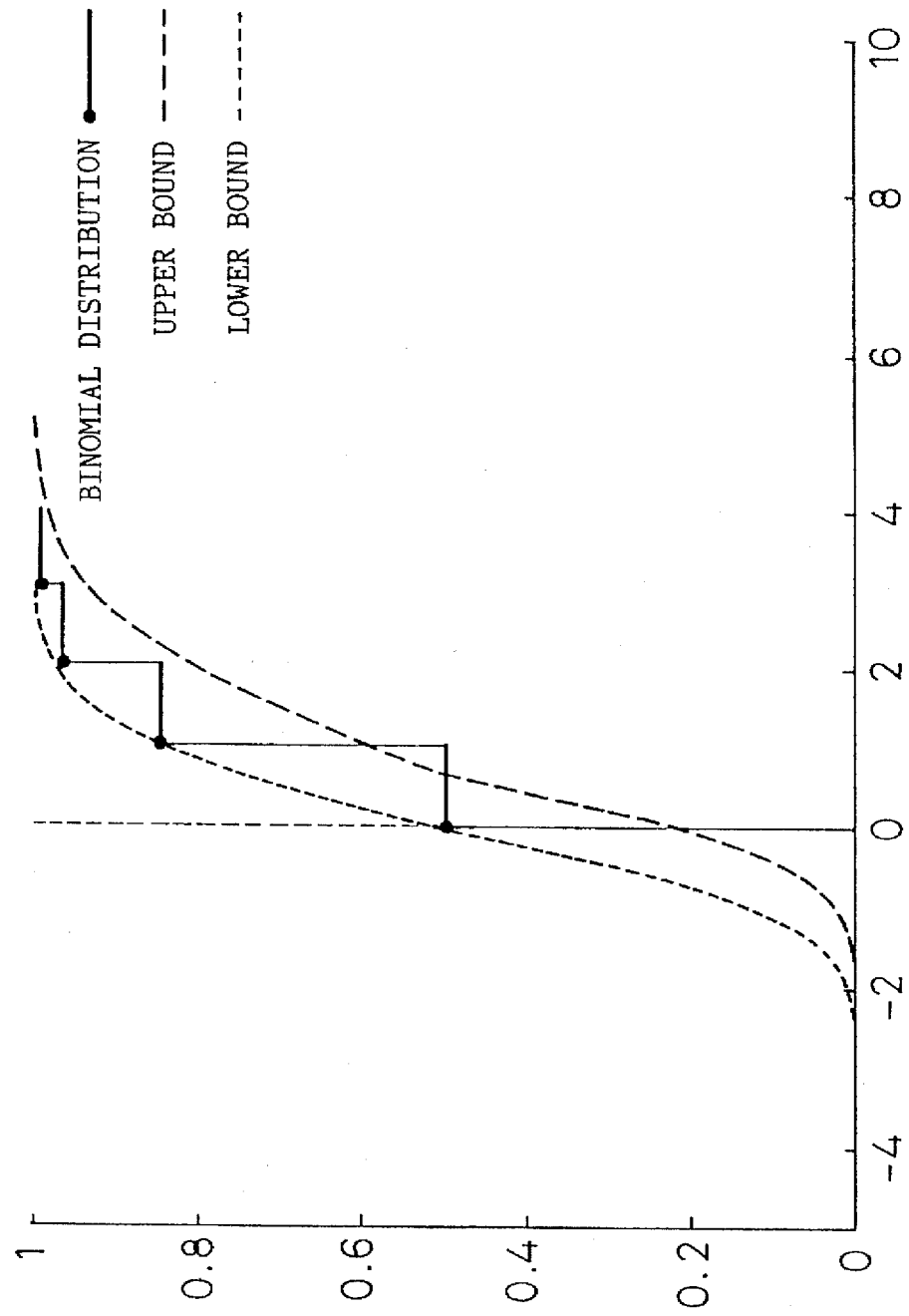
FIG. 13 is a diagram showing an example of a binomial distribution and an example of a distribution function for an asymmetric normal distribution defining the upper and lower bounds of the binomial distribution.
Figure 14:
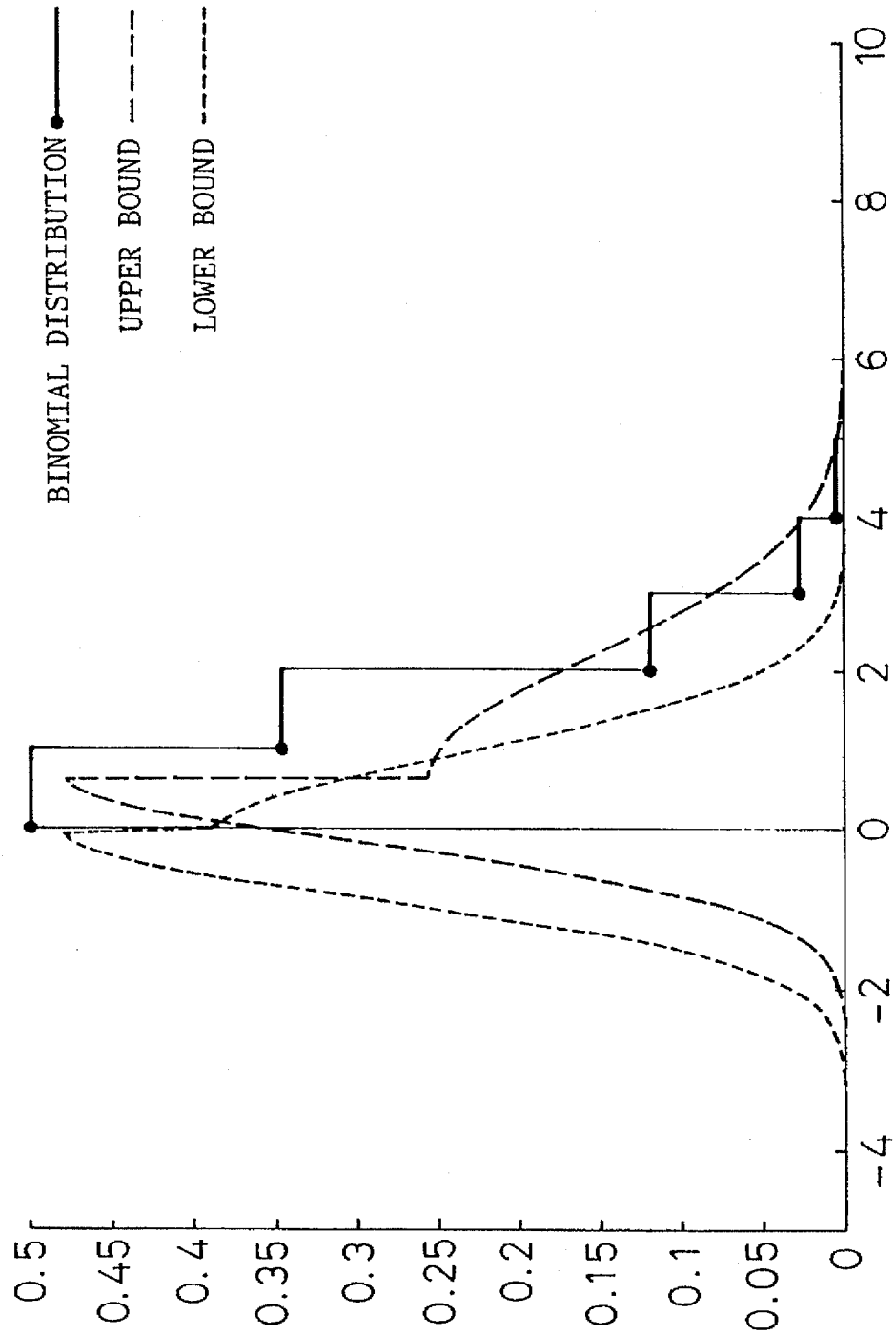
FIG. 14 is a diagram showing a probability function corresponding to the distribution function shown in FIG. 13.

It is therefore desirable to determine the upper and lower bounds using asymmetric normal distributions, such as shown by a distribution function in FIG. 13 and a probability function in FIG. 14. In FIG. 14, the right and left normal distributions are respectively connected at a point where the integrated value is 0.5, and the variance of the normal distribution in the right side is larger for the upper bound than for the lower bound, whereas the variance of the normal distribution in the left side is larger for the lower bound than for the upper bound. The convex hull is determined separately in the right and left sides. More specifically, the convex hull is determined so that for the upper bound, it is downwardly convex for the right-side normal distribution and upwardly convex for the left-side normal distribution, and for the lower bound, upwardly convex for the right-side normal distribution and downwardly convex for the left-side normal distribution.

Furthermore, considering the fact that the binomial distribution of the arrival count distribution is close to the Poisson distribution, it is also possible to use the Poisson distribution, instead of the normal distribution, to determine the upper and lower bounds. More specifically, consider the probability $P\{a_t=k\}$, k being the arrival rate at, having the Poisson distribution $$P\{a_t=k\}=m^k e^{-m}/k!$$

where m is the occurrence rate. Then, the value of m is determined by numerical calculation so that the Poisson distribution defines the upper and lower bounds for the given binomial distribution. When the occurrence rates m of the Poisson distribution for the thus determined upper and lower bounds are denoted by $m_U$ and $m_L$, respectively, and the mean (equal to arrival rate) of each of the original binomial distributions is r, the parameter of the Poisson distribution that provides the upper and lower bounds of the arrival count distribution can be determined as a function of the arrival rate by plotting $r-m_U$ and $r-m_L$ respectively on a two-dimensional plane and determining their convex hulls. Since the Poisson distribution has only one parameter, there is no need to make one of two parameters agree at the upper and lower bounds as previously described of the normal distribution.

2. Cell flow rate monitoring

In the model shown in FIG. 1, if the probability of a cell being output from the outgoing line 16 in unit time is $v_t(1)$ and the probability of no cell output is $v_t(0)$, these probabilities are expressed as $$v_t(0)=a_t(0)q_t(0)$$

$$v_t(1)=1-v_t(0)=1-a_t(0)q_t(0) \qquad (27)$$

As described in 1., when a value r of the arrival rate $r_t$ is determined, the arrival count distribution $a_t(i)$ is determined, and the mean time series leading to r is also determined, so that the resulting cell length distribution $q_t(i)$ is determined. Therefore, from Expression (27), $v_t(1)$, i.e., the cell flow rate on the outgoing line 16, can be determined as a function of $r_t$, written $u(r_t)$. Since $r_t$ is a random variable, $u(r_t)$ is also a random variable. If the probability distribution function of $r_t$ is written $g(r_t)$, the cell flow rate probability distribution function $f(x)$ can be expressed as $$f(x)=g(u^{-1}(x)) \qquad (28)$$

Here, it is proven that $\bar{f}(x)$ in the same form as Expression (28) but calculated using the upper bounds $\bar{u}(r_t)$, $\bar{g}(x)$ for $u(r)$, $g(x)$, that is $$\bar{f}(x)=\bar{g}(\bar{u}^{-1}(x))$$

has the following relation with $f(x)$.

$$f(x) \leq \bar{f}(x) \qquad (29)$$

If we define $$F(x)=\int_x^\infty df = 1-f(x)$$

$$\bar{F}(x)=\int_x^\infty df = 1-\bar{f}(x) \qquad (30)$$

the probability that all observation values of the cell flow rate in n short periods $T_0$, spaced from each other at intervals of time $T_1$ sufficient to make cell arrivals independent of each other, will become equal to x or larger, is $$(F(x))^n$$

From (29) and (30), this value has the following relation with $(\bar{F}(x))^n$ $$(F(x))^n \leq (\bar{F}(x))^n$$

Therefore, when the condition is judged as being abnormal or normal based on whether the cell flow rate observations in the n $T_0$-periods are all equal to $x_0$ or larger, the probability level, p, of the judgement is $$p \leq (\bar{F}(x_0))^n$$

In an actual process, n and p are determined appropriately, the value of $$\sqrt[n]{p}$$

is set equal to $\bar{F}(x_0)$, and the inverse function of the function $\bar{F}(x_0)$ is calculated to determine the threshold value $x_0$ for the judgement. According to the method described in 1., the upper bounds for the arrival count distribution $a_t(i)$ and cell length distribution $q_t(i)$ for each appearance value of $r_t$ are obtained from the parameters of the call source on the incoming line side; therefore, from Expression (27), the function $\bar{u}(r_t)$ is obtained numerically, and the upper bound $\bar{g}(r_t)$ of the distribution of $r_t$ is also obtained, so that the inverse function of $\bar{F}(x_0)$ can be calculated numerically.

Thus, each time the call admission condition on the input side changes, the threshold value $x_0$ is calculated by the above procedure, and the value is compared with the actual measured value, thus enabling abnormality in the cell flow rate to be detected with the probability level not exceeding the predetermined level.

The minimum required value of the time interval $T_1$ is determined by the characteristics of the call classes that constitute the load; in practice, the average ON duration of each call class will be adequate for the value of $T_1$. Alternatively, a sufficiently large constant independent of the call classes that constitute the load, for example, the maximum value of the burst duration time $T_i$ of the call source expected for admission, may be used as the value of $T_1$.

Figure 15:
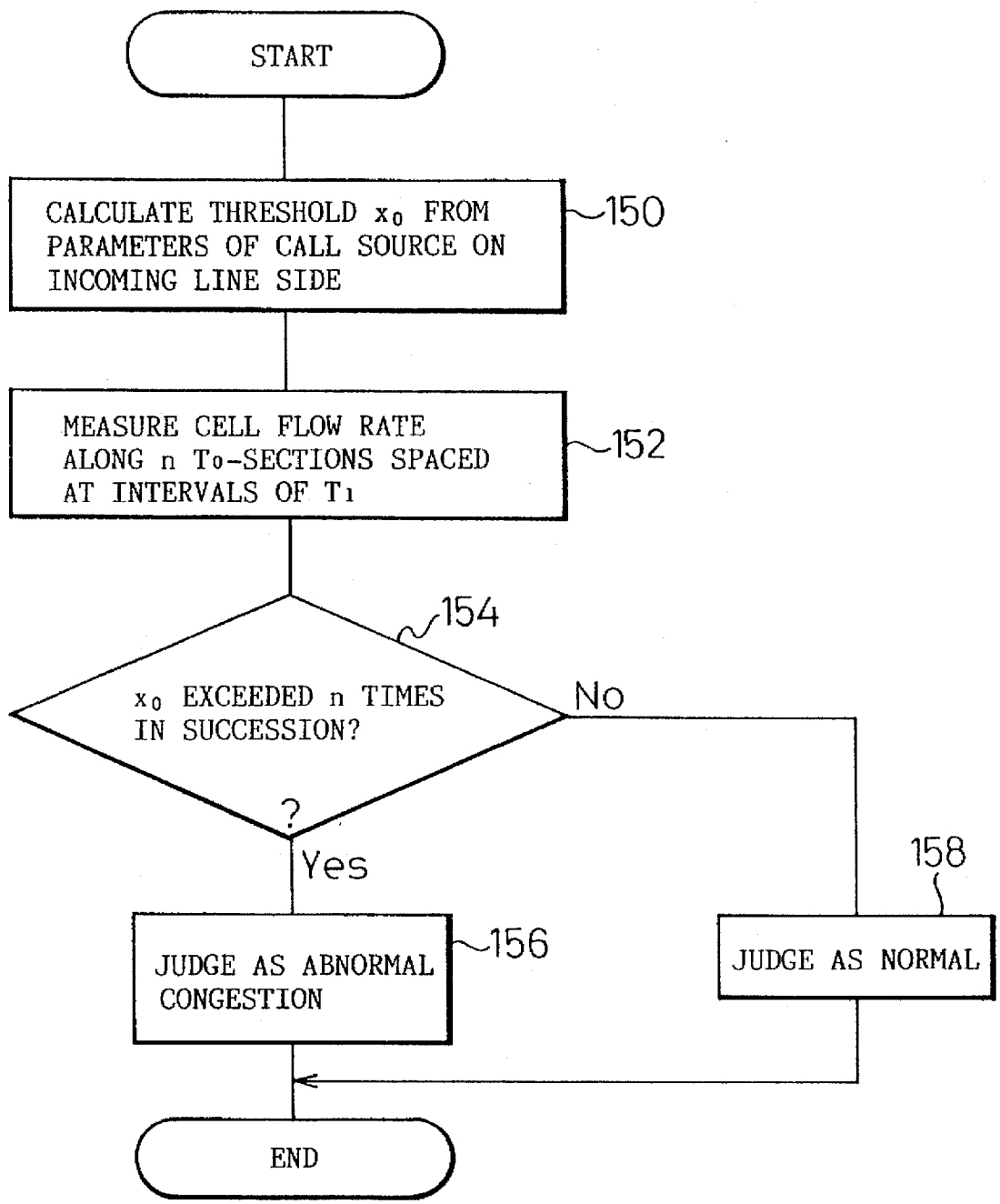
FIG. 15 is a flowchart illustrating the processing performed in a cell flow rate monitoring apparatus according to the invention.

FIG. 15 is a flowchart illustrating the processing performed in the cell flow rate monitoring apparatus of the present invention. First, from the parameters of the call source on the incoming line side, the upper bound $\bar{g}(r_t)$ of the arrival rate distribution, the upper bound $\bar{a}_t(i)$ of the arrival count distribution, and the upper bound $\bar{q}_t(i)$ of the cell length distribution are calculated, and from these values, the upper bound $\bar{u}(r_t)$ of the link utilization function is calculated to determine the threshold value $x_0$ for the cell flow rate at the outgoing line side (step 150). At the outgoing line side, the cell flow rate in $T_0$ period is measured n times at $T_1$ intervals (step 152), and the result is compared with the threshold value $x_0$ (step 154). If the measured value has exceeded $x_0$ n times in succession, the condition is judged as being abnormal congestion (step 156), and otherwise, the condition is judged as being normal (step 158). It is desirable that the judgement for abnormality be performed continuously and that the calculation of the threshold value $x_0$ be performed each time the call admission condition on the incoming line side changes.

3. Internetwork connection

Figure 16:
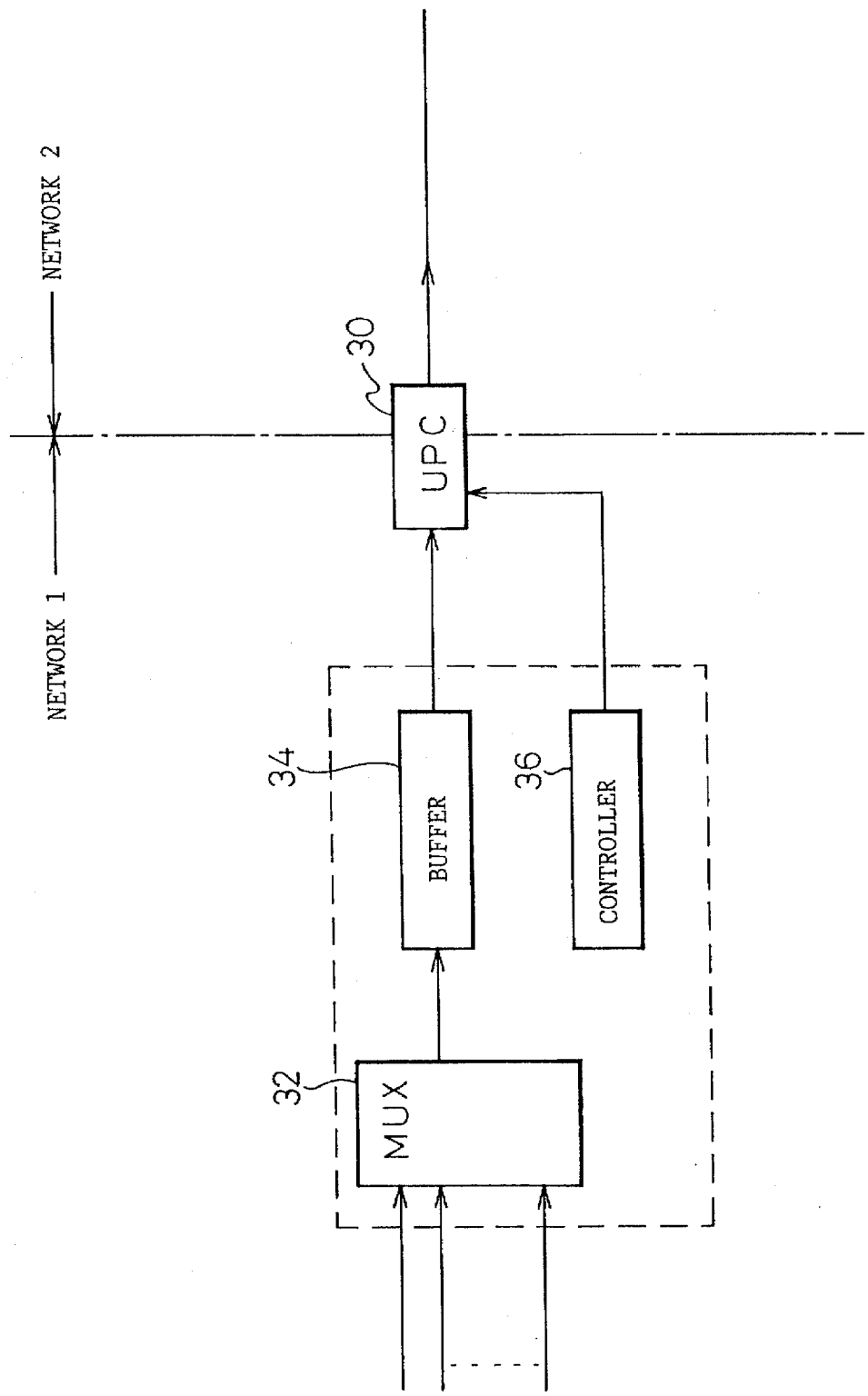
FIG. 16 is a diagram showing an internetwork connection apparatus according to the invention.

FIG. 16 is a diagram showing an internetwork connection apparatus according to the present invention. A UPC 30 is provided at the junction between network 1 (for example, LAN) and network 2 (for example, public network). Cells to be transferred from network 1 to network 2 are multiplexed by a multiplexer 32 and transmitted out to the network 2 via a buffer 24 and UPC 30. The UPC 30 stops the transmission of cells exceeding the declared value of the call class received from a controller 36. The cells turned away by the UPC 30 are queued in the buffer 34.

The illustrated configuration can be considered as being equivalent to the configuration shown in FIG. 1 with the UPC 30 added on the outgoing line side of the multiplexer 14. Therefore, similarly to Expression (1), the cell length $q_{t+1}$ in the buffer 34 can be expressed as $$q_{t+1} = 0 \quad (q_t + a_t - v_t < 0)$$

$$q_{t+1} = q_t + a_t - v_t \quad (0 \leq q_t + a_t - v_t \leq K)$$

$$q_{t+1} = K \quad (K < q_t + a_t - v_t) \tag{31}$$

where $v_t$ is the number of cells (the number being 0 or 1) output from the UPC 30 at time t.

For convenience of explanation, the parameters ($T_0$, $X_0$, T, X) proposed in the previously mentioned document will be used as the UPC parameters monitored by the UPC 30, but it will be recognized that the method of the invention can also be applied to other similar monitoring parameters used to measure the number of cells arriving in a finite time. When the current time is denoted by t, the UPC 30

(1) allows the transmission of cells if the number of cells transmitted in time interval $(t-T_0, t)$ is not larger than $X_0-1$ and the number of cells transmitted in time interval $(t-T, t)$ is not larger than $X-1$, and (2) otherwise, prohibits the transmission of cells.

Therefore, cell transmission at time t is allowed only when the following two conditions are met.

(1) At time t, there is a cell stored in the buffer, or there is a cell arrival at that time.

(2) At time t, a cell can be transmitted out.

Let us consider a random variable $u_t^{(0)}$ representing the number of cells transmitted in time interval $(t-T_0, t)$, and let $u_t^{(0)}(x)$ be its probability density function, $u_t^{(1)}$ be the probability function representing the number of cells transmitted in time interval $(t-T, t)$, and $u_t^{(1)}(x)$ be its probability density function. Then, the probability density function of $v_t$ is expressed as $$v_t(1) = (1 - a_t(0) q_t(0)) \cdot \left( \sum_{x=0}^{X_0-1} u_t^{(0)}(x) \right) \left( \sum_{x=0}^{X-1} u_t^{(1)}(x) \right) \tag{32}$$

$$= \left( \sum_{x=1}^{\infty} a_t(x) \right) \left( \sum_{x=1}^{\infty} q_t(x) \right) \left( \sum_{x=0}^{X_0-1} u_t^{(0)}(x) \right) \left( \sum_{x=0}^{X-1} u_t^{(1)}(x) \right)$$

$$v_t(0) + v_t(1) = 1$$

Noting that the intervals $T_0$ and $T$ shift by one unit time, $u^{(0)}_{t+1}(x)$ and $u^{(1)}_{t+1}(x)$ are calculated as $$u^{(0)}_{t+1}(x) = v_t(0) \, v_{t-T_0+1}(1) \, u_t^{(0)}(x+1) + \tag{33}$$

$$(v_t(0) \, v_{t-T_0+1}(0) + v_t(1) \, v_{t-T_0+1}(1)) \, u_t^{(0)}(x) +$$

$$v_t(1) \, v_{t-T_0+1}(0) \, u_t^{(0)}(x-1)$$

$$u^{(1)}_{t+1}(x) = v_t(0) \, v_{t-T+1}(1) \, u_t^{(1)}(x+1) + \tag{34}$$

$$(v_t(0) \, v_{t-T+1}(0) + v_t(1) \, v_{t-T+1}(1)) \, u_t^{(1)}(x) +$$

$$v_t(1) \, v_{t-T+1}(0) \, u_t^{(1)}(x-1)$$

Similarly to Expression (2), using the transition probability matrix S Expression (31) is rewritten $$q_{t+1} = S q_t \tag{35}$$

where $q_t$ and $q_{t+1}$ are vectors representing the corresponding discrete probability distributions, and S is the transition probability matrix calculated from $a_t(x)$ and $v_t(x)$. Using the column vectors, the matrix S is expressed as $$S = [s_0 \, s_1 \ldots s_K] \tag{36}$$

Then, each vector $s_i$ is a discrete probability distribution in which the sum of the elements is unity, and when the number of input call sources to the multiplexer is n, if $K \geq n+i$, then $$s_1 = \begin{bmatrix} 0 \\ \cdot \\ \cdot \\ \cdot \\ 0 \\ a_i(0)v_i(1) \\ a_i(0)v_i(0)+a_i(1)v_i(1) \\ \cdot \\ \cdot \\ a_i(x)v_i(0)+a_i(x+1)v_i(1) \\ \cdot \\ \cdot \\ \cdot \\ a_i(n)v_i(0) \\ 0 \\ \cdot \\ \cdot \\ \cdot \\ 0 \end{bmatrix} \begin{matrix} <i-1 \\ <n+i \end{matrix} \quad (37)$$

and if $K<n+i$, then $$s_1 = \begin{bmatrix} 0 \\ \cdot \\ \cdot \\ \cdot \\ 0 \\ a_i(0)v_i(1) \\ a_i(0)v_i(0)+a_i(1)v_i(1) \\ \cdot \\ \cdot \\ \cdot \\ a_i(x)v_i(0)+a_i(x+1)v_i(1) \\ \cdot \\ \cdot \\ \cdot \\ a_i(K-i+2)v_i(0)+\sum_{x=K-i+1}^{n} a_i(x) \end{bmatrix} <i-1 \quad (38)$$

where "$<i-1$" and "$<n+i$" are subscripts to be placed on the elements $a_i(0)v_i(1)$ and $a_i(n)v_i(0)$ in the corresponding matrices. For example, for $i=2$ $$s_2 = \begin{bmatrix} 0 \\ a_i(0)v_i(1) \\ a_i(0)v_i(0)+a_i(1)v_i(1) \\ \cdot \\ \cdot \\ \cdot \\ a_i(n)v_i(0) \\ \cdot \\ \cdot \\ \cdot \\ 0 \end{bmatrix}$$

Here, when Procedures (1)–(3) in 1. are carried out in accordance with the method described in 1. but by using the transition probability matrix S instead of M, the upper and lower bounds are determined for the cell length distribution $q_r$ in the configuration where the UPC is provided on the outgoing line side, and the cell loss rate, delay time, and various other QOS parameters can be obtained on the safe side.

Using the upper bounds of the column vectors, the upper bound $\overline{S}$ of the transition probability matrix S used here is written $$\overline{S}=[\overline{s_0}\ \overline{s_1}\ \ldots\ \overline{s_K}]$$

Then, if $K \geq n+1$, the upper bound vector is $$\overline{s_1} = \begin{bmatrix} 0 \\ \cdot \\ \cdot \\ \cdot \\ 0 \\ \overline{a_i}(0)\underline{v_i}(1) \\ \overline{a_i}(0)\underline{v_i}(0)+\overline{a_i}(1)\underline{v_i}(1) \\ \cdot \\ \cdot \\ \overline{a_i}(x)\underline{v_i}(0)+\overline{a_i}(x+1)\underline{v_i}(1) \\ \cdot \\ \cdot \\ \overline{a_i}(n)\underline{v_i}(0) \\ 0 \\ \cdot \\ \cdot \\ \cdot \\ 0 \end{bmatrix} \begin{matrix} <i-1 \\ <n+i \end{matrix}$$

and if $K<n+i$, the upper bound vector is $$\overline{s_1} = \begin{bmatrix} 0 \\ \cdot \\ \cdot \\ \cdot \\ 0 \\ \overline{a_i}(0)\underline{v_i}(1) \\ \overline{a_i}(0)\underline{v_i}(0)+\overline{a_i}(1)\underline{v_i}(1) \\ \cdot \\ \cdot \\ \cdot \\ \overline{a_i}(x)\underline{v_i}(0)+\overline{a_i}(x+1)\underline{v_i}(1) \\ \cdot \\ \cdot \\ \overline{a_i}(K-i+2)\underline{v_i}(0)+\sum_{x=K-i+1}^{n} \overline{a_i}(x) \end{bmatrix} <i-1$$

Likewise, for the lower bound, if $K \geq n+i$, then

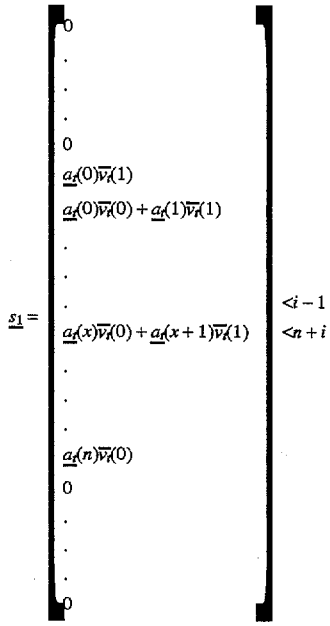

and if $K < n+i$, then

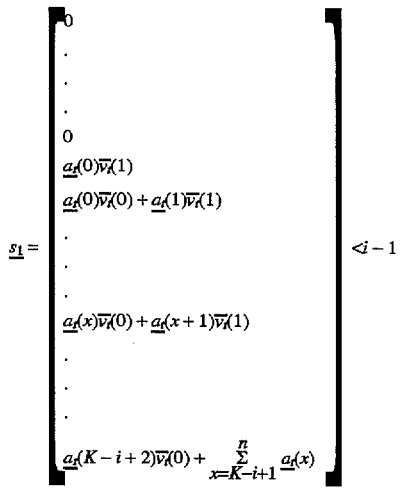

The upper and lower bounds of each element are obtained as follows. From Expressions (32), (33), and (34)

$$\overline{v_t}(1) = (1 - \overline{a_t}(0)\overline{q_t}(0)) \cdot \left( \sum_{x=0}^{X_0 - 1} \overline{u_t^{(0)}}(x) \right) \left( \sum_{x=0}^{X-1} \overline{u_t^{(1)}}(x) \right)$$

$$\overline{u_{t+1}^{(0)}}(x) = \underline{v_t}(0)\overline{v_{t-T_0+1}}(1)\overline{u_t^{(0)}}(x+1) +$$

$$(\underline{v_t}(0)\overline{v_{t-T_0+1}}(0) + \underline{v_t}(1)\overline{v_{t-T_0+1}}(1))\overline{u_t^{(0)}}(x) +$$

$$\underline{v_t}(1)\overline{v_{t-T_0+1}}(0) + \overline{u_t^{(0)}}(x - 1)$$

$$\overline{u_{t+1}^{(1)}}(x) = \underline{v_t}(0)\overline{v_{t-T+1}}(1)\overline{u_t^{(1)}}(x+1) +$$

$$(\underline{v_t}(0)\overline{v_{t-T+1}}(0) + \underline{v_t}(1)\overline{v_{t-T+1}}(1))\overline{u_t^{(1)}}(x) +$$

$$\underline{v_t}(1)\overline{v_{t-T+1}}(0)\overline{u_t^{(1)}}(x - 1)$$

Likewise $$\underline{v_t}(1) = (1 - \underline{a_t}(0)\underline{q_t}(0)) \cdot \left( \sum_{x=0}^{X_0 - 1} \underline{u_t^{(0)}}(x) \right) \left( \sum_{x=0}^{X-1} \underline{u_t^{(1)}}(x) \right)$$

$$\underline{u_{t+1}^{(0)}}(x) = \overline{v_t}(0)\underline{v_{t-T_0+1}}(1)\underline{u_t^{(0)}}(x+1) +$$

$$(\overline{v_t}(0)\underline{v_{t-T_0+1}}(0) + \overline{v_t}(1)\underline{v_{t-T_0+1}}(1))\underline{u_t^{(0)}}(x) +$$

$$\overline{v_t}(1)\underline{v_{t-T_0+1}}(0)\underline{u_t^{(0)}}(x - 1)$$

$$\underline{u_{t+1}^{(1)}}(x) = \overline{v_t}(0)\underline{v_{t-T+1}}(1)\underline{u_t^{(1)}}(x+1) +$$

$$(\overline{v_t}(0)\underline{v_{t-T+1}}(0) + \overline{v_t}(1)\underline{v_{t-T+1}}(1))\underline{u_t^{(1)}}(x) +$$

$$\overline{v_t}(1)\underline{v_{t-T+1}}(0)\underline{u_t^{(1)}}(x - 1)$$

As shown above, the upper and lower bounds of $u_t^{(0)}(x)$ and $u_t^{(1)}(x)$ are each given in the form of a recurrence relation, so that when initial values are determined, the subsequent values are sequentially determined in a recursive manner. The initial values for $u_t^{(0)}(x)$ and $u_t^{(1)}(x)$ in equilibrium state are determined by the relaxation method as follows. Since the initial values are obtained when in equilibrium state, it follows that $u_t^{(0)}(x)$ and $u_{t+1}^{(0)}(x)$, which is written $u^{(0)}(x)$. Similarly, $u_t^{(1)}(x)$ and $u_{t+1}^{(1)}(x)$ are written $u^{(1)}(x)$, and $v_t(x)$, $v_{t+1}(x)$, $v_{t-T+1}(x)$, and $v_{t-T0+1}(x)$ are written $v(x)$.

i) Initially set $$u^{(0)}(0) = u^{(1)}(0) = 1$$

$$u^{(0)}(x) = u^{(1)}(x) = 0 \quad (x \neq 0)$$

ii) Using Expression (32), calculate $v(x)$.

iii) Using Expressions (37) and (38), calculate the matrix S, and solve the equation $q = Sq$ of Expression (35) in equilibrium state to obtain the cell length distribution in equilibrium state.

iv) Using Expression (32), calculate $v(x)$, and using Expressions (33) and (34), calculate $u_t^{(0)}(x)$ and $u_t^{(1)}(x)$.

v) Repeat iii) and iv) until good convergence is obtained with respect to q.

Figure 17:
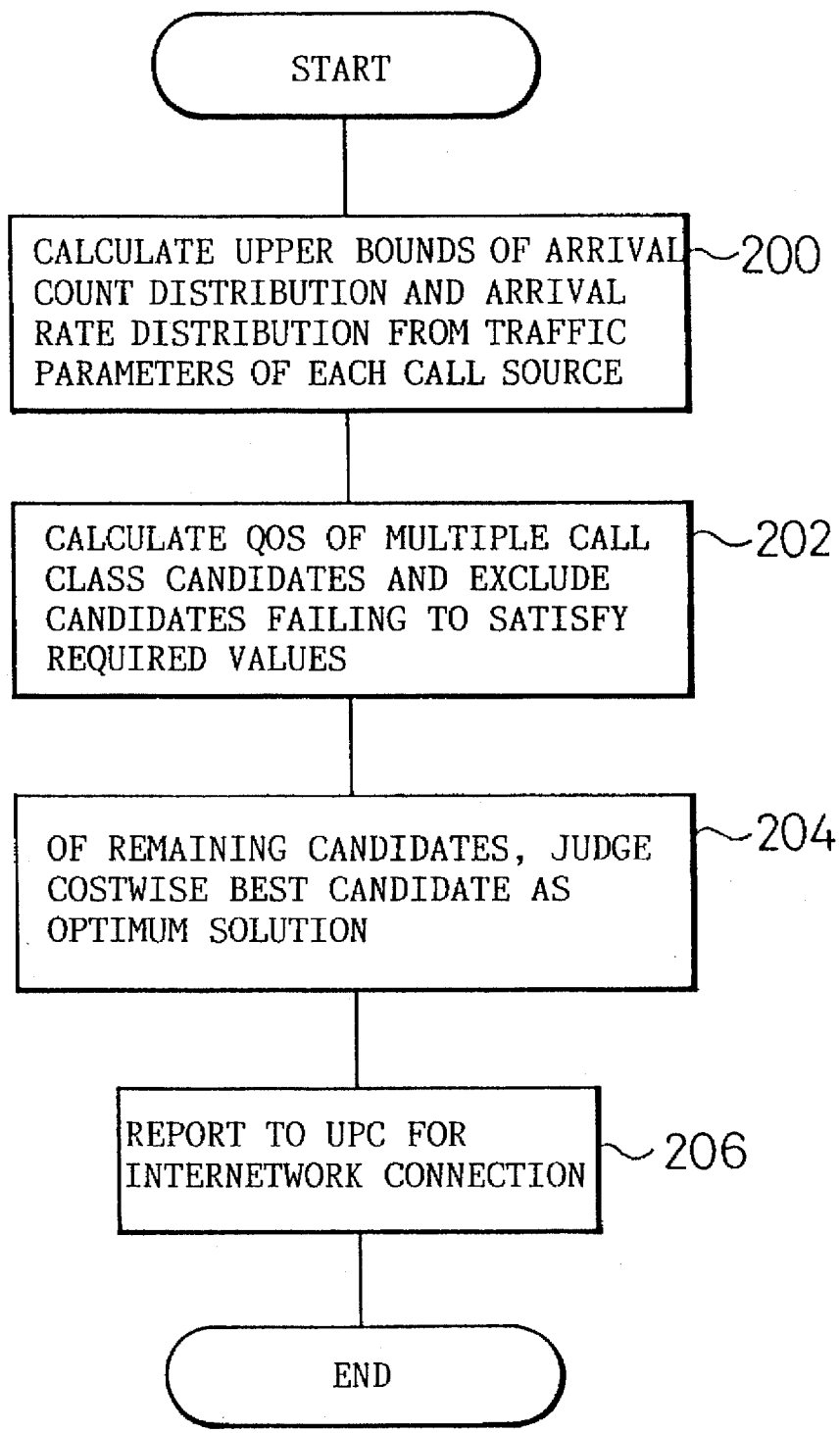
FIGS. 17 and 18 are flowcharts illustrating the processing performed in the internetwork connection apparatus according to the invention.

FIG. 17 is a flowchart illustrating the processing performed in the controller 36 shown in FIG. 16. First, among the call sources belonging to the network 1, the call sources expected for connection to the network 2 are selected, and from their traffic parameters, the upper bounds of the arrival count distribution and arrival rate distribution are calculated in accordance with Procedures (1) and (2) described in 1 (step 200). Next, a plurality of candidates are selected as call classes to be declared to the UPC 30, and for each of the selected classes, QOS parameters are calculated in accordance with the above procedures; those candidates that do not satisfy the required values are removed from the candidate list (step 202). The remaining candidates are compared in terms of cost (presented from the carrier operating the network 2), and the best one is judged as being the optimum solution (step 204). The values are then declared to the UPC 30 which establishes a connection to the network 2 (step 206).

The traffic parameters, such as peak rate and average rate, used in step 200 are values declared from each call source, but instead of such declared values, values measured during communication in the network 1 prior to the connection to the network 2 may be used.

We claim:

1. A call admission control method in an asynchronous transfer mode, comprising the steps of:
   a) storing first data which include information concerning upper bounds of the probability distributions of the number of arrivals for a plurality of values of arrival rate;
   b) determining an upper bound of a probability distribution of an arrival rate in a call admitted state which is to be evaluated;
   c) determining, by using said first data, an upper bound of a probability distribution of a cell length which is given by upper bounds of the probability distributions of the number of arrivals along said determined upper bound of the probability distribution of the arrival rate;
   d) determining, by using said upper bound of the probability distribution of the cell length, upper limits of parameters representing the quality of service in said call admitted state;
   e) judging whether to admit or reject a requested call on the basis of said evaluated quality of service;
   f) rejecting the requested call when the requested call is judged to be rejected in step e; and
   g) admitting the requested call when the requested call is judged to be admitted in step e.

2. A method according to claim 1, wherein the upper bound of the probability distribution of the number of arrivals has a normal distribution.

3. A method according to claim 1, wherein the upper bound of the probability distribution of the number of arrivals has a Poisson distribution.

4. A method according to claim 1, wherein the upper bound of the probability distribution of the arrival rate has a normal distribution.

5. A method according to claim 2, wherein said first data is obtained by determining, for each of a plurality of possible call classes, a normal distribution that can provide the upper bound of the distribution of the number of arrivals for every possible case that can occur within a single call class, and by determining convex hulls for all of said determined upper-bound defining normal distributions on a two-dimensional plane defined by the mean and variance of the normal distribution.

6. A method according to claim 3, wherein said first data is obtained by determining, for each of a plurality of possible call classes, a Poisson distribution that can provide the upper bound of the distribution of the number of arrivals for every possible case that can occur within a single call class, and by determining convex hulls for all of said determined upper-bound defining Poisson distributions on a two-dimensional plane defined by the mean of the distribution of the number of arrivals and the occurrence rate of the Poisson distribution that provides the upper bound thereof.

7. A method according to claim 4, further comprising the step of e) storing second data, including, for each of a plurality of possible call classes, the mean and variance of a normal distribution that can provide the upper bound of the probability distribution of the arrival rate for every possible degree of multiplexing that can occur within a single call class, wherein the step b) includes obtaining the mean and variance of the upper-bound defining normal distribution by summing the mean values and variances obtained by referencing said second data in accordance with the degree of multiplexing of each call class in said call admitted state.

8. A method according to claim 1, wherein the step c) includes:

for each of a plurality of appearance values of the arrival rate, determining on the basis of said first data the probability distribution of the cell length, which is given by the upper bound of the probability distribution of the number of arrivals, for a time series that defines the upper bound of an average time series that makes a transition from an average arrival rate to each appearance value of the arrival rate in a time interval T corresponding to the maximum value of the burst duration time prescribed at each call source; and determining the upper bound of the probability distribution of the cell length by summing the probability distributions of the cell length corresponding to the respective appearance values of the arrival rate by weighting the same by the appearance probability of each appearance value of the arrival rate.

9. A method according to claim 1, wherein in said step a), said first data further includes information concerning a lower bound of said probability distribution, in said step b), a lower bound of the probability distribution of the arrival rate is further determined, in said step c), a lower bound of the probability distribution of the cell length, which is given by the lower bound of the probability distribution of the number of arrivals along said determined lower bound of the probability distribution of the arrival rate, is further determined, and in said step d), using said lower bound of the probability distribution of the cell length, lower limits of said parameters are further determined, said method further comprising the steps of
   f) carrying out said steps b), c), and d) by limiting the call sources to be evaluated to call sources having a higher priority than call sources of a certain priority class,
   g) carrying out said steps b), c), and d) by limiting the call sources to be evaluated to call sources of said priority class and call sources having a higher priority than the same, and
   h) calculating the parameters only of the call sources of said priority class from the upper and lower limits of the parameters determined in said steps f) and g).

10. A method according to claim 8, wherein said time series of the arrival rate includes a time series that varies linearly from the average arrival rate to the appearance value of the arrival rate in said time interval T.

11. A method according to claim 8, wherein said time series of the arrival rate includes a time series that varies linearly with the slope determined by values of the burst duration time prescribed at respective call sources.

12. A call admission control apparatus in an asynchronous transfer mode, comprising:

first storage means for storing first data which include information concerning upper bounds of probability distributions of the number of arrivals for a plurality of values of arrival rate;

arrival rate determining means for determining an upper bound of a probability distribution of an arrival rate in a call admitted state which is to be evaluated;

cell length determining means for determining, by using said first data, an upper bound of a probability distribution of a cell length which is given by upper bounds of probability distributions of the number of arrivals along said determined upper bound of the probability distribution of the arrival rate;

parameter determining means for determining, by using said upper bound of the probability distribution of the cell length, upper limits of parameters representing quality of service in said call admitted state;

judging means for judging whether to admit or reject a requested call on the basis of said evaluated quality of service;

rejecting means for rejecting the requested call when the requested call is judged to be rejected by the judging means; and admitting means for admitting the requested call when the requested call is judged to be admitted by the judging means.

13. An apparatus according to claim 12, wherein the upper bound of the probability distribution of the number of arrivals has a normal distribution.

14. An apparatus according to claim 12, wherein the upper bound of the probability distribution of the number of arrivals has a Poisson distribution.

15. An apparatus according to claim 12, wherein the upper bound of the probability distribution of the arrival rate has a normal distribution.

16. An apparatus according to claim 13, wherein said first data is obtained by determining, for each of a plurality of possible call classes, a normal distribution that can provide the upper bound of the distribution of the number of arrivals for every possible case that can occur within a single call class, and by determining convex hulls for all of said determined upper-bound defining normal distributions on a two-dimensional plane defined by the mean and variance of the normal distribution.

17. An apparatus according to claim 14, wherein said first data is obtained by determining, for each of a plurality of possible call classes, a Poisson distribution that can provide the upper bound of the distribution of the number of arrivals for every possible case that can occur within a single call class, and by determining convex hulls for all of said determined upper-bound defining Poisson distributions on a two-dimensional plane defined by the mean of the distribution of the number of arrivals and the occurrence rate of the Poisson distribution that provides the upper bound thereof.

18. An apparatus according to claim 15, further comprising second storage means for storing second data, including, for each of a plurality of possible call classes, the mean and variance of a normal distribution that can provide the upper bound of the probability distribution of the arrival rate for every possible degree of multiplexing that can occur within a single call class, wherein said arrival rate determining means obtains the mean and variance of the upper-bound defining normal distribution by summing the mean values and variances obtained by referencing said second data in accordance with the degree of multiplexing of each call class in said call admitted state.

19. An apparatus according to claim 12, wherein said cell length determining means includes:

means for determining, for each of a plurality of appearance values of the arrival rate, and on the basis of said first data, the probability distribution of the cell length, which is given by the upper bound of the probability distribution of the number of arrivals, for a time series that defines at least the upper bound of an average time series that makes a transition from an average arrival rate to each appearance value of the arrival rate in a time interval T corresponding to the maximum value of the burst duration time prescribed at each call source; and means for determining the upper bound of the probability distribution of the cell length by summing the probability distributions of the cell length corresponding to the respective appearance values of the arrival rate by weighting the same by the appearance probability of each appearance value of the arrival rate.

20. An apparatus according to claim 12, wherein said first data stored in said first storage means further includes information concerning a lower bound of said probability distribution, said arrival rate determining means further determines a lower bound of the probability distribution of the arrival rate, said cell length determining means further determines a lower bound of the probability distribution of the cell length which is given by the lower bound of the probability distribution of the number of arrivals along said determined lower bound of the probability distribution of the arrival rate, and said parameter determining means further determines lower limits of said parameters by using said lower bound of the probability distribution of the cell length, said apparatus further comprising first means for activating said arrival rate determining means, said cell length determining means, and said parameter determining means by limiting the call sources to be evaluated to call sources having a higher priority than call sources of a certain priority class, second means for activating said arrival rate determining means, said cell length determining means, and said parameter determining means by limiting the call sources to be evaluated to call sources of said priority class and call sources having a higher priority than the same, and means for calculating the parameters only of the call sources of said priority class from the upper and lower limits of the parameters determined by said first and said second means.

21. An apparatus according to claim 19, wherein said time series of the arrival rate includes a time series that varies linearly from the average arrival rate to the appearance value of the arrival rate in said time interval T.

22. An apparatus according to claim 19, wherein said time series of the arrival rate includes a time series that varies linearly with the slope determined by values of the burst duration time prescribed at respective call sources.

23. A cell flow rate monitoring method in an asynchronous transfer mode, comprising the steps of:

a) storing first data which include information concerning upper bounds of the probability distributions of the number of arrivals for a plurality of values of arrival rate;

b) determining an upper bound of a probability distribution of an arrival rate;

c) determining, by using said first data, an upper bound of a probability distribution of a cell length which is given by upper bounds of probability distributions of the number of arrivals along said determined upper bound of the probability distribution of the arrival rate;

d) determining a threshold value for the cell flow rate at an outgoing line side by using said upper bounds of the probability distributions of the number of arrivals, said upper bound of the probability distribution of the cell length, and said upper bound of the probability distribution of the arrival rate;

e) judging abnormality in the cell flow rate at the outgoing line side on the basis of said threshold value; and f) adjusting the number of arrivals when an abnormality is judged to exist.

24. A method according to claim 23, wherein said step e) includes:

measuring the cell flow rate at the outgoing line side at intervals of time sufficient for generation of cells independent of each other at the outgoing line side; and judging the cell flow rate as being abnormal when the measured cell flow rate has exceeded said threshold value a plurality of times in succession.

25. A method according to claim 23, wherein said step d) includes:

determining an upper bound of a probability distribution of the cell flow rate from said upper bound of the probability distribution of the number of arrivals, said upper bound of the probability distribution of the cell length, and said upper bound of the probability distribution of the arrival rate; and determining said threshold value from said upper bound of the probability distribution of the cell flow rate and a value of a prescribed probability level.

26. A cell flow rate monitoring apparatus in an asynchronous transfer mode, comprising:

first storage means for storing first data which include information concerning upper bounds of the probability distributions of the number of arrivals for a plurality of values or arrival rate;

arrival rate determining means for determining an upper bound of a probability distribution of an arrival rate;

cell length determining means for determining, by using said first data, an upper bound of a probability distribution of a cell length which is given by the upper bounds of the probability distributions of the number of arrivals along said determined upper bound of the probability distribution of the arrival rate;

threshold value determining means for determining a threshold value for the cell flow rate at an outgoing line side by using said upper bounds of the probability distributions of the number of arrivals, said upper bound of the probability distribution of the cell length, and said upper bound of the probability distribution of the arrival rate;

abnormality judging means for judging abnormality in the cell flow rate at the outgoing line side on the basis of said threshold value; and means for adjusting the number of arrivals in response to judging by said abnormality judging means that said threshold value is exceeded.

27. An apparatus according to claim 26, wherein said abnormality judging means includes:

means for measuring the cell flow rate at the outgoing line side at intervals of time sufficient for generation of cells independent of each other at the outgoing line side; and means for judging the cell flow rate as being abnormal when the measured cell flow rate has exceeded said threshold value a plurality of times in succession.

28. An apparatus according to claim 26, wherein said threshold value determining means includes:

means for determining an upper bound of a probability distribution of the cell flow rate from said upper bound of the probability distribution of the number of arrivals, said upper bound of the probability distribution of the cell length, and said upper bound of the probability distribution of the arrival rate; and means for determining said threshold value from said upper bound of the probability distribution of the cell flow rate and a value of a prescribed probability level.

29. An internetwork connection method, in an asynchronous transfer mode, for connecting a first network to a second network via a user parameter control, comprising the steps of:

a) storing first data for said first network, said first data including information concerning upper bounds of probability distributions of the number of arrivals for a plurality of values of arrival rate;

b) determining an upper bound of a probability distribution of an arrival rate in said first network;

c) determining, by using said first data, an upper bound of a probability distribution of a cell length which is given by upper bounds of probability distributions of the number of arrivals along said determined upper bound of the probability distribution of the arrival rate by using a transition probability matrix containing characteristics of said user parameter control;

d) determining, by using said upper bound of the probability distribution of the cell length, upper limits of parameters representing the quality of service when said first network is connected to said second network;

e) judging whether to connect or reject a connection of said first and second networks on the basis of said evaluated quality of service;

f) rejecting the connection when the connection is judged to be rejected in step e; and g) connecting said networks when a connection between said networks is judged to be acceptable in step e.

30. A method according to claim 29, wherein in said step c), the upper bound of the probability distribution of the cell length is determined for each of a plurality of candidate sets of declared values representing the characteristics of said user parameter control, and in said step d), the upper limits of the parameters representing the quality of service are determined for each of said plurality of candidate sets of declared values, said method further comprising the step of e) excluding from said plurality candidate sets those candidate sets that fail to satisfy a required quality of service, selecting one of the remaining candidate sets, and reporting the same to said user parameter control for connection.

31. An internetwork connection apparatus, in an asynchronous transfer mode, for connecting a first network to a second network via a user parameter control, comprising:

first storage means for storing first data for said first network,, said first data including information concerning upper bounds of probability distributions of the number of arrivals for a plurality of values of arrival rate;

arrival rate determining means for determining an upper bound of a probability distribution of an arrival rate in said first network;

cell length determining means for determining, by using said first data, an upper bound of a probability distribution of a cell length which is given by the upper bounds of the probability distributions of the number of arrivals along said determined upper bound of the probability distribution of the arrival rate by using a transition probability matrix containing characteristics of said user parameter control;

parameter determining means for determining, by using said upper bounds of the probability distribution of the cell length, upper limits of parameters representing the quality of service when said first network is connected to said second network;

judging means for judging whether to connect or reject connection of said first and second networks based on said quality of service;

rejecting means for rejecting the connection when the connection is judged to be rejected by the judging means; and connecting means for connecting said first and second networks when the judging means judges a connection is acceptable.

32. An apparatus according to claim 31, wherein said cell length determining means determines the upper bound of the probability distribution of the cell length for each of a plurality of candidate sets of declared values representing the characteristics of said user parameter control, and said parameter determining means determines the upper limits of the parameters representing the quality of service for each of said plurality of candidate sets of declared values, said apparatus further comprising connecting means for excluding from said plurality candidate sets those candidate sets that fail to satisfy a required quality of service, selecting one of the remaining candidate sets, and reporting the same to said user parameter control for connection.

33. A method according to claim 9, wherein said time series of the arrival rate includes a time series that varies linearly from the average arrival rate to the appearance value of the arrival rate in said time interval T.

34. A method according to claim 9, wherein said time series of the arrival rate includes a time series that varies linearly with the slope determined by values of the burst duration time prescribed at respective call sources.

35. An apparatus according to claim 20, wherein said time series of the arrival rate includes a time series that varies linearly from the average arrival rate to the appearance value of the arrival rate in said time interval T.

36. An apparatus according to claim 20 wherein said time series of the arrival rate includes a time series that varies linearly with the slope determined by values of the burst duration time prescribed at respective call sources.

37. An apparatus according to claim 27, wherein said threshold value determining means includes:

means for determining an upper bound of a probability distribution of the cell flow rate from said upper bound of the probability distribution of the number of arrivals, said upper bound of the probability distribution of the cell length, and said upper bound of the probability distribution of the arrival rate; and means for determining said threshold value from said upper bound of the probability distribution of the cell flow rate and a value of a prescribed probability level.

* * * * *